(12) United States Patent
Trotta et al.

(10) Patent No.: US 8,581,903 B2
(45) Date of Patent: *Nov. 12, 2013

(54) METHOD AND SYSTEM FOR CONVERTING ENGINEERING DATA INTO 3D MODELING DATA

(75) Inventors: Brian W. Trotta, Lenexa, KS (US); Christopher C. Wills, Shawnee, KS (US); Juan A. Uribe, Kansas City, MO (US)

(73) Assignee: HNTB Holdings Ltd, Kansas City, MO (US)

( * ) Notice: Subject to any disclaimer, the term of this patent is extended or adjusted under 35 U.S.C. 154(b) by 631 days.

This patent is subject to a terminal disclaimer.

(21) Appl. No.: 12/713,407

(22) Filed: Feb. 26, 2010

(65) Prior Publication Data

US 2010/0149180 A1 Jun. 17, 2010

Related U.S. Application Data

(63) Continuation of application No. 11/313,145, filed on Dec. 19, 2005, now Pat. No. 7,714,860, which is a continuation of application No. 10/653,479, filed on Sep. 2, 2003, now Pat. No. 7,002,573.

(51) Int. Cl.
| | |
|---|---|
| G06T 17/00 | (2006.01) |
| G06T 15/00 | (2011.01) |
| G06T 15/10 | (2011.01) |
| G06T 15/20 | (2011.01) |

(52) U.S. Cl.
USPC .............................. 345/420; 345/419; 345/427

(58) Field of Classification Search
USPC .......................................... 345/427, 419, 420
See application file for complete search history.

(56) References Cited

U.S. PATENT DOCUMENTS

| | | | | |
|---|---|---|---|---|
| 4,686,634 | A | * | 8/1987 | Schrieber ...................... 345/442 |
| 5,754,183 | A | * | 5/1998 | Berend et al. ................. 345/592 |
| 5,848,190 | A | * | 12/1998 | Kleehammer et al. ........ 382/218 |
| 6,057,852 | A | * | 5/2000 | Krech, Jr. ..................... 345/589 |
| 6,307,551 | B1 | * | 10/2001 | Gueziec et al. ............... 345/419 |
| 6,366,825 | B1 | * | 4/2002 | Smalley et al. ............... 700/120 |
| 6,496,185 | B1 | * | 12/2002 | Keam ............................ 345/419 |
| 6,496,601 | B1 | * | 12/2002 | Migdal et al. ................. 382/239 |
| 6,618,759 | B1 | * | 9/2003 | Lefebvre et al. .............. 709/235 |
| 7,150,026 | B2 | * | 12/2006 | le Masno do Chormont .................... 719/328 |
| 7,216,003 | B2 | * | 5/2007 | Faulkner et al. ................ 700/26 |
| 2003/0130040 | A1 | * | 7/2003 | Dripps ............................ 463/42 |
| 2004/0153824 | A1 | * | 8/2004 | Devarajan et al. .............. 714/38 |

\* cited by examiner

*Primary Examiner* — Jeffrey Chow
(74) *Attorney, Agent, or Firm* — Shook, Hardy & Bacon L.L.P.

(57) ABSTRACT

A system and method for converting data generated in an computer engineering design software component to an alternate format usable by a variety of alternate software components is provided. Engineering data from a project having a plurality of objects is provided. Objects are selected from the project for conversion and transportation to one of the alternate software components. The selected objects are converted to an alternate format, transported to the alternate software component and regenerated by the alternate software component in its own environment.

18 Claims, 27 Drawing Sheets

METHOD AND SYSTEM FOR CONVERTING ENGINEERING DATA INTO 3D MODELING DATA

CROSS-REFERENCE TO RELATED APPLICATIONS

This application is a continuation of U.S. application Ser. No. 11/313,145, filed Dec. 19, 2005, which is a continuation of U.S. application Ser. No. 10/653,479, filed Sep. 2, 2003, which claims the benefit of U.S. Provisional Application No. 60/440,507, filed Jan. 16, 2003, all of which are incorporated herein by reference in their entireties.

STATEMENT REGARDING FEDERALLY SPONSORED RESEARCH OR DEVELOPMENT

Not applicable.

BACKGROUND OF THE INVENTION

The present invention relates to a method and system for converting engineering data into three-dimensional (3D) modeling data to permit the production of technically accurate 3D models. More particularly, this invention relates to a method by which a user can electronically convert technically accurate engineering data into an alternate and generally smaller but still technically accurate format, transport the converted data to a 3D modeling software component and have the 3D modeling software component create technically accurate photo realistic 3D models.

In the architectural industry, for example, engineering designs are normally presented as words (specifications) and two-dimensional drawings (plan sets). The plan sets are most often created in computer aided design (CAD) software packages and are extremely detailed and accurate. While these specifications and plan sets are a compact and efficient means of delivering the necessary information for construction of the underlying project, they require interpretation and a high level of understanding of the engineering process in order to visualize the final as-built conditions. As the complexity of a project increases, visualization becomes difficult even for technically astute engineers and architects. Over the years it has been found that a better way to convey design concepts is through hand-made artist's renderings or, as of late, photo realistic artist's renderings, generated from computerized 3D models.

While artist's renderings can be beautiful and compelling, they often lack true dimensional accuracy. Artist's renderings are simply a graphical representation of the artist's interpretation of the project based on the information they have been provided (often the specification and plan sets) and are ultimately quite subjective. Apart from being technically inaccurate, artist's renderings are rather time-consuming, expensive and do not lend themselves to frequent design changes.

A truer and more accurate representation of design concepts can be achieved through the use of mathematically defined, three-dimensional computer models. These types of models provide unrestricted movement throughout a scene and can be rendered from any point-of-view. Many engineers use three-dimensional design tools as part of their everyday workflows. Often these tools have some limited 3D visualization (rendering) capability built-in and are adequate to help the designer picture his/her design but are not up to the standards of quality and sophistication expected in the 3D graphic arts community. That level of quality, the norm in the general media, is what the public has come to expect. To achieve that quality, the actual design information from the engineering design software must be transferred in some way to a professional 3D modeling package. The problem, however, is that the underlying file format of engineering software is generally not compatible with industry standard 3D modeling packages.

In engineering design software packages, designs are often represented by triangulated irregular networks ("TIN") often called TIN models. TINs, among others, are widely used in geographic information systems ("GIS") to represent digital terrain models. TINs are a surface representation derived from irregularly spaced sample points and multiple types of breakline features. TINs are formed by connecting a set of points (scattered or gridded) having x, y and z coordinates. These points are connected by edges to form a set of non overlapping triangles used to represent the surface. The surface is assumed to change its planar continuity at adjoining triangles' edges. Each TIN has data associated therewith that includes topological relationships between points and their proximal triangles. FIG. 1 illustrates a TIN model of a sunken roadway with an overpass.

While TIN models are a generally acceptable method of representing designs, large or complex models create an overwhelming amount of data as x, y and z information is needed for each point in the model. This large amount of data often exceeds the memory and processing capacity of even dedicated high-end computers frequently causing them to crash. Additionally, the data from the engineering design software package is generally in a file format which is incompatible with 3D modeling packages, thereby making it unusable. Consequently, to make use of high-end professional 3D modeling packages, designs, which have already been created in a engineering design software package, must regularly be re-created from scratch in the 3D modeling package.

The resulting design created anew in the 3D modeling package does not make direct use of the data from the design created in the engineering design software package. In this case, the operator of the 3D modeling package manually approximates the design of the engineering design software package and tries to recreate the appearance of the design in the 3D modeling package. An attempt is made to connect multiple points eliminating the planar edges created by the triangles, thus creating more continuous surface features. In this respect, the 3D modeling package operator is merely functioning like the artist in the aforementioned artist rendering scenario and is not able to directly use the electronic engineering data from the engineering design software package. This duplication of effort is costly, time-consuming and reduces the accuracy of the resulting 3D model.

Therefore, there is a need for a method of converting complex engineering design data to a format usable by commercially available professional 3D modeling packages.

SUMMARY OF THE INVENTION

In order to overcome the above stated problems and limitations, and to achieve the noted advantages, there is provided a method (as well as non-transitory computer-readable media having computer-executable instructions for performing the method) of converting electronic data generated in an engineering design software component to a format which is readily transferable to a 3D modeling software component and to a format which is readily usable by the 3D modeling software component to generate 3D models based thereon.

In one embodiment, the present invention ties together a set of processes with custom computer programming to streamline the process of 3D visualization of complex engineering designs. In this embodiment, the invention is an integrated system of software and procedures designed to enhance interactive visualization for design analysis and to permit increased input and involvement from project owners and stakeholders, including the public. The invention provides for an accurate and interactive design visualization system.

In one embodiment, the present invention takes many practices used in civil design and combines them with GIS tools in order to standardize transfer of data sets from engineering design software into 3D visualization software to permit the production of mathematically accurate simulations. This direct translation of the design data eliminates the need to re-create the data in a professional 3D modeling package. The present invention converts engineering design data to a type that can be utilized with a variety of third-party software packages. For example, and not as a limitation, the invention permits output from InRoads™ civil design software to be converted to a format where the output data is usable by 3D Studio Max™ 3D visualization software to produce high end, mathematically accurate three-dimensional computer models of a project. The invention also permits interactive viewer inclusion and simulation package integration.

In one embodiment, the invention may be embodied in software which converts engineering data from civil design software to a series of mathematically defined curves. FIG. 1 illustrates a traditional 3D TIN model from engineering data of an exemplar project. FIG. 2 illustrates a 3D model based on the same engineering data after implementation of the present invention. This innovative approach of converting points to curves greatly reduces the amount of data associated with designs which has traditionally been the source of problems in design file conversion, yet it provides the quality expected by the 3D graphic arts community. Additionally, the conversion does not result in a significant loss of precision.

The invention is also useful not only as a visualization tool, but, because of its speed and accuracy, the invention can be used as a design tool during the design process. Because of the numerous steps involved in the prior art method of 3D modeling, creating multiple 3D models to use to assist in the design of a project was a lengthy, time consuming and costly process and was therefore not practical or feasible. Additionally, because the resulting 3D models were not mathematically accurate, they were not truly helpful in visualizing design changes.

In an engineering or architectural setting, a primary function of a design manager is to analyze and refine project designs and construction phasing proposed by design consultants. The present invention can be implemented by the design manager to meet this requirement. The design manager or a project team can use the present invention to rapidly prototype photorealistic 3D models of a construction project at regular intervals to analyze if proposed designs are meeting project goals outside of design criteria. This type of review normally would not occur and would be part of a post evaluation process once the project was built, thus of no benefit to the current project. The resulting 3D models can be used not only as a design tool to aid in visualization during all phases of the project, but also as a tool to get the design owner or the public more involved. The streamlined and cost-effective process of the present invention make this feasible in a way never before possible.

Presenting designs in this visual format allows all stakeholders, not just engineers or architects, to be able to understand and see for themselves the impacts of design decisions. Design deficiencies, even when technically compliant with design standards, become obvious in 3D virtual reality type images and can be identified early in the design process when viewed in this manner. For example, FIG. 3 illustrates an artist's rendering of the project which is the subject of the TIN model of FIG. 1. FIG. 4 illustrates a print out of a 3D model of the same project prepared by the present invention directly from its design data. The artist's subjective rendering of the bridge/retaining walls in FIG. 3 implies that the structure fits pleasantly into its environment. However, as clearly illustrated in FIG. 4, the representation generated by the present invention shows that the retaining walls in the design would actually create a unpleasant canyon-like effect. This example illustrates how a design conforming to all pertinent design criteria can fail in implementation.

As mentioned above, another advantage of the present invention is that the models used for design visualization can be re-used in a public project by incorporation into presentation boards, videos, web sites, print literature, interactive multimedia—almost any delivery method. The present invention permits the models to be used in connection with simulation data in a traffic modeling package to present, in a highly accurate form, the movement of vehicles through a project, such as a toll plaza or an interchange.

In short, the present invention permits engineering data to be converted and used in a plurality of commercially available software packages for the creation of a host of three-dimensional effects including drive-throughs and fly-bys, exterior-to-interior transitions, character modeling, creation of natural elements, surface textures and materials, and a host of special effects from explosions to neon light emissions all in a quantitatively accurate representation or duplication of the elements under study. The resulting accurate 3D models can then easily be animated and/or merged with digital video.

Additionally, while the example given herein as an implementation of the present invention is in the architectural industry, the present invention is in no way limited to such an application. The present invention could be used in any setting where someone wishes to use available technically accurate engineering data generated in a computer aided design software application in a non-CAD software application, such as a 3D modeling software package to generate technically accurate photo realistic 3D models. For example, the present invention could be implemented in the avionics industry to assist with wing design.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWINGS

The features of the invention noted above are explained in more detail with reference to the embodiments illustrated in the attached drawing figures, in which like reference numerals denote like elements, in which FIGS. 5-26 illustrate an embodiment of the present invention and in which:

FIG. 5 is a schematic diagram of a suitable computing system environment for use in implementing the present invention;

FIG. 6 is a schematic diagram of an embodiment of the overall method of the present invention;

FIG. 7 is a flow diagram illustrating a method of selecting objects for conversion and transport;

FIG. 8 is a flow diagram illustrating a method of converting and transporting data;

FIG. 9 is a flow diagram illustrating a method of converting and transporting an object as a mathematical curve;

FIG. 10 is a flow diagram illustrating a method of converting and transporting an object as a railed surface;

FIG. 11 is a flow diagram illustrating a method of converting and transporting an object as a mathematical surface;

FIG. 12 is a flow diagram illustrating a method of converting and transporting an object as a mesh surface;

FIG. 13 is a flow diagram illustrating a method of converting and transporting an object as an entity replacement;

FIG. 14 is a flow diagram illustrating a method of erecting a Bézier curve set;

FIG. 15 is a flow diagram illustrating a method of erecting a NURBS curve;

FIG. 17 is a flow diagram illustrating a method for sending data;

FIG. 18 is a flow diagram illustrating a method for receiving data;

FIG. 19 is a flow diagram illustrating a method for managing connection handlers;

FIG. 20 is a flow diagram illustrating a method for handling a connections communications;

FIG. 22 is a flow diagram illustrating a method of reading and parsing received data;

FIG. 23 is a flow diagram illustrating a method of handling a 3DObject creation request;

FIG. 24 is a flow diagram illustrating a method of managing a tag stack;

FIG. 25 is a flow diagram illustrating a method of appending components; and

FIG. 26 is a flow diagram illustrating a method of handling an end tag request.

DETAILED DESCRIPTION OF THE INVENTION

Figure 1:
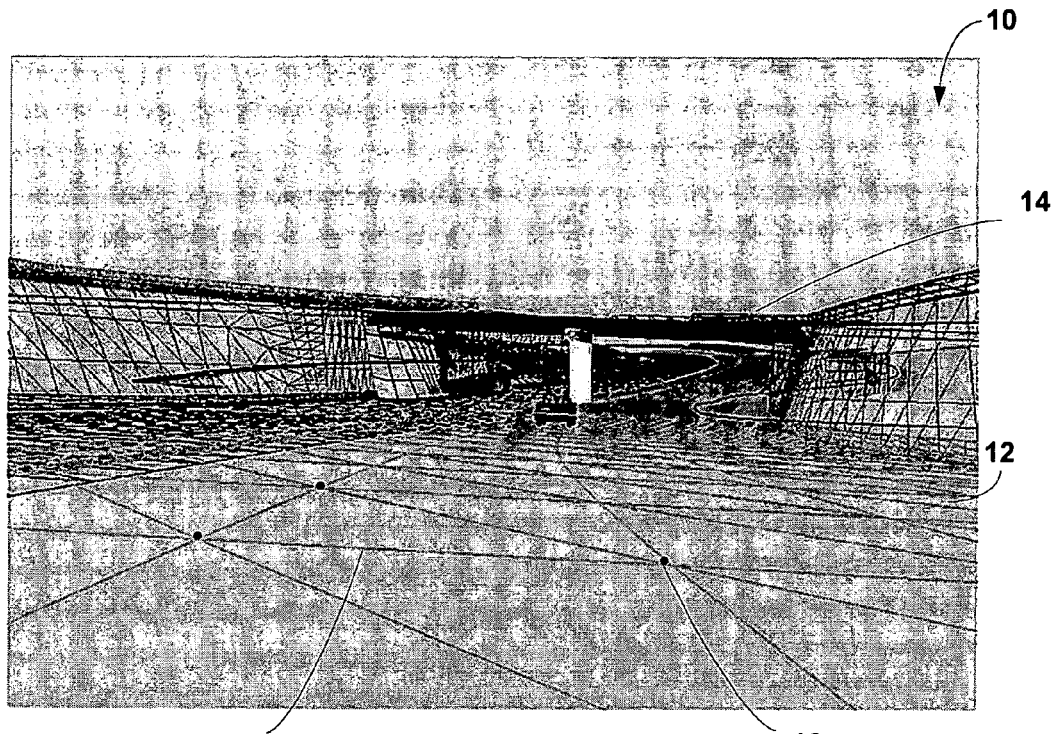
FIG. 1 is a design illustrated as a triangulated irregular network model.

Referring now to the drawings in more detail and initially to FIG. 1, numeral 10 generally designates a design or project. The project 10 is a sunken roadway 12 with an overpass 14. In FIG. 1, the project 10 is illustrated by way of a traditional triangulated irregular network ("TIN") model. As discussed above, a TIN consists of a plurality of non-overlapping triangles 16 which connect a plurality of points 18. Each of the points 18 has data associated therewith representing the points X, Y and Z coordinates. As is illustrated in FIG. 1, as the change in the terrain of the design 10 increases, the sizes of the associated triangles 16 decreases to permit the associated triangles 16 to represent the terrain changes. Consequently, as the level of changes in the terrain increases, the amount of data associated therewith increases. Each of the triangles 16 are wholly independent from one another in the respect that altering the orientation of one triangle does not change the orientation of a non-adjoining triangle.

Figure 2:
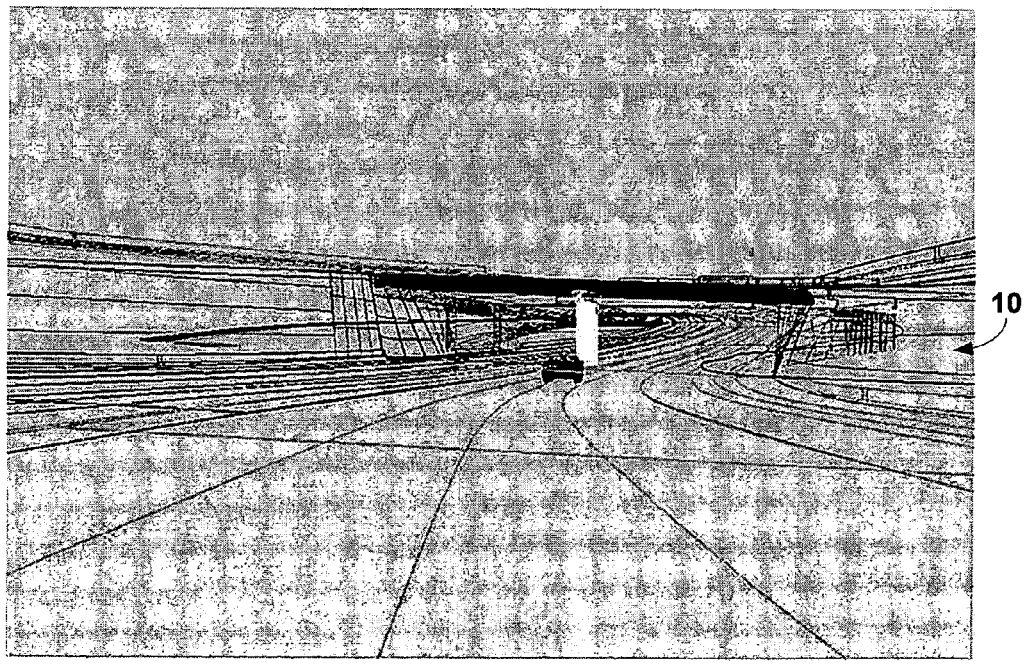
FIG. 2 is the same design illustrated after the engineering data associated with the design has been converted according to the present invention.
Figure 3:
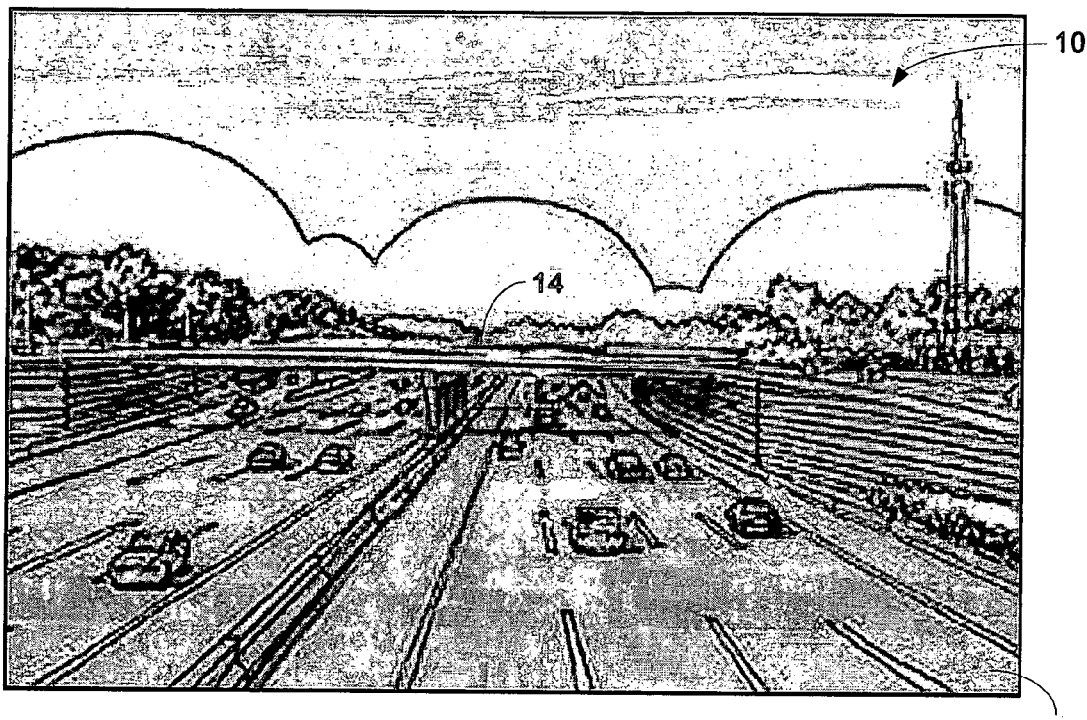
FIG. 3 is an artist's rendering of the same design.
Figure 4:
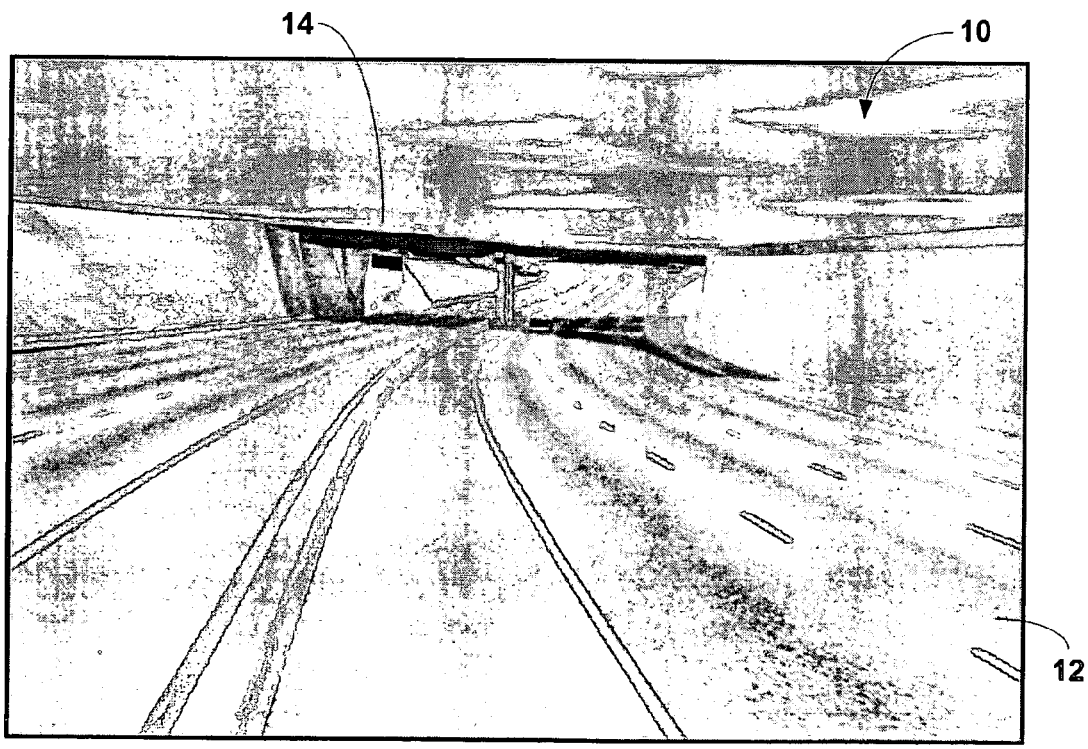
FIG. 4 is a print out of a 3D model of the same design generated in a 3D modeling software package using the converted engineering data according to the present invention.

FIG. 2 is an illustration of the same project 10 illustrated in FIG. 1. The model illustrated in FIG. 2 is based on the same engineering data that the model of FIG. 1 was based; however, the model of FIG. 2 was generated after the engineering data associated with the design was converted according to the present invention. FIG. 3 contains an artist's rendering of the same project 10. FIG. 3 illustrates how much an artist's interpretation of a project, which is usually formed after reviewing specifications and plan sets, can differ from the actual design. FIG. 4 is a print out of a 3D model of the same project 10; however, the 3D model was generated in a 3D modeling software package and used the engineering data which was converted according to the present invention.

Figure 5:
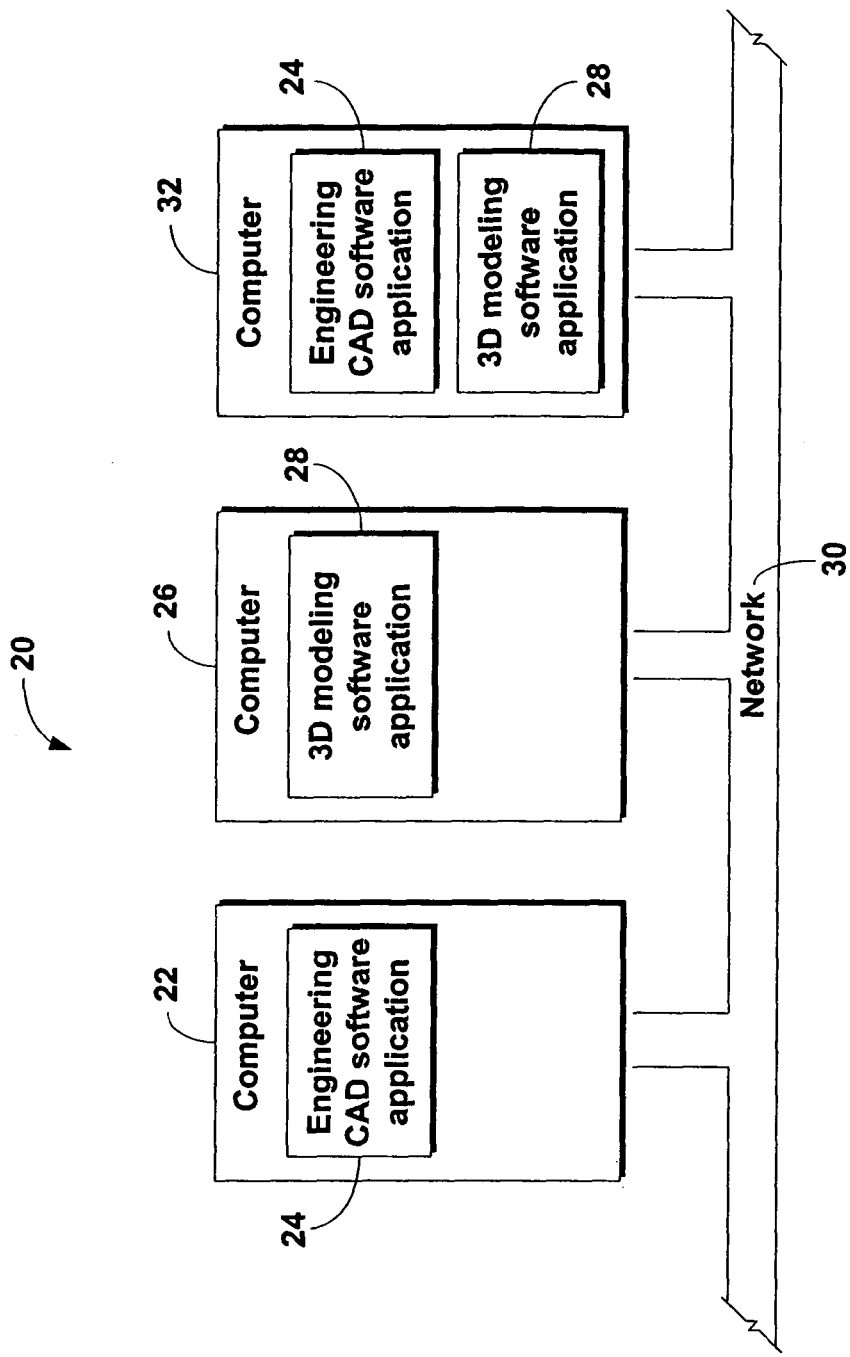

Turning now to FIG. 5, a computing system environment 20 which is suitable for implementing the present invention is illustrated. The illustrated computing system environment is only one possible embodiment of a suitable computing system environment, is provided only by way of an example, and is not intended to suggest any limitation as to the scope of use or functionality of the invention. The environment 20 includes a computer 22 which operates an engineering computer aided design ("CAD") software application. A second computer 26 operates a 3D modeling software application. The computers 22, 26 are linked through a communications network 30. In an alternate embodiment, the engineering CAD software application 24 in the 3D modeling software application 28 reside on and are operated by the same computer 32.

Figure 6:
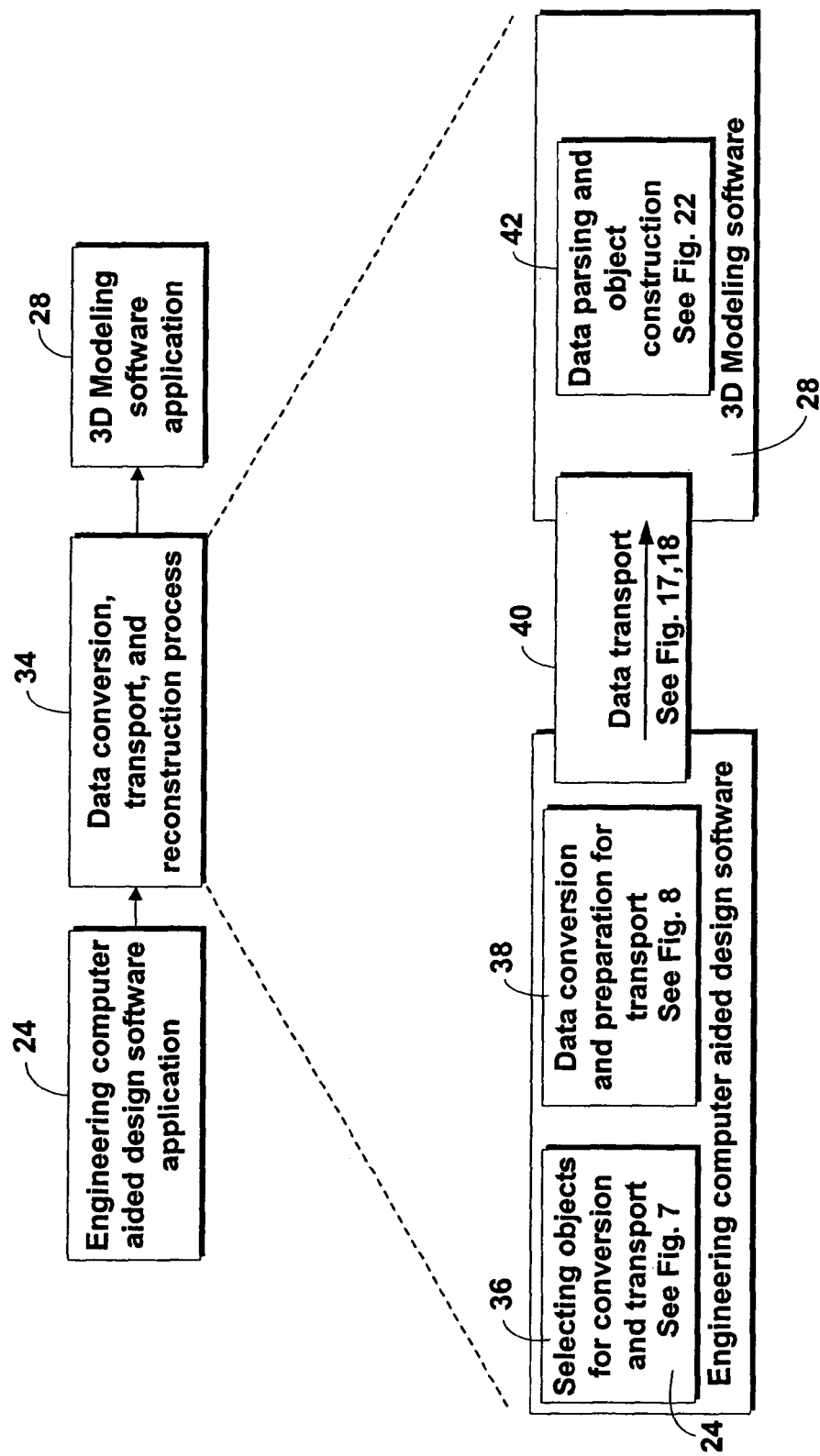

FIG. 6 illustrates a schematic diagram of the overall method of the present invention. As explained above and as discussed in greater detail below, an embodiment of the present invention permits the use of data obtained from an engineering CAD software application 24 in a 3D modeling software application 28. In FIG. 6, an embodiment of the present invention is depicted as step 34. While alternate embodiments of the present invention are provided, step 34 is broken down into various steps in FIG. 6 for illustrative purposes.

In this embodiment of the present invention, objects are selected from the engineering data associated with the design 10 for conversion and transport at step 36. Step 36 is discussed in greater detail below with reference to FIG. 7. At step 38 the data associated with the selected objects is converted and prepared for transport. Step 38 is discussed in greater detail below with reference to FIG. 8. In the present embodiment, steps 36 and 38 are preferably performed within the engineering CAD software application 24. It should be readily understood that step 34 could easily be performed by an alternate dedicated software application.

The resulting data after step 38 is then transported at step 40 to, in the present embodiment, the 3D modeling software application 28. The data transport step 40 is described in greater detail below with reference to FIGS. 17 and 18. In the illustrated embodiment, a program written to accomplish steps 36 and 38 is also written to establish a connection, via a communications network link, with a second program that is interfacing with the 3D modeling software application 28. The data is then sent via the link to the receiving application at step 40. Again, it should be noted that, while the data is indicated and being transferred in step 40 to the 3D modeling software application 28, this is only with reference to the illustrated embodiment. In an alternate embodiment, the data could be transported to an alternate software application depending on the desired use of the data.

In step 42, the data is received and put into a format which is usable by the receiving software application, in this instance the 3D modeling software application 28, and objects are constructed as native objects from the received data in the 3D modeling environment. While step 42 has been illustrated in this embodiment to be performed within the 3D modeling software application 28, it should be readily understood that, in an alternate embodiment, step 42 is performed in a dedicated software application separate from or together with steps 36, 38. If steps 36, 38 and 42 were performed in a dedicated software application, it would be unnecessary to perform step 40 therein. Step 42 is discussed in greater detail below with reference to FIG. 22.

Figure 7:
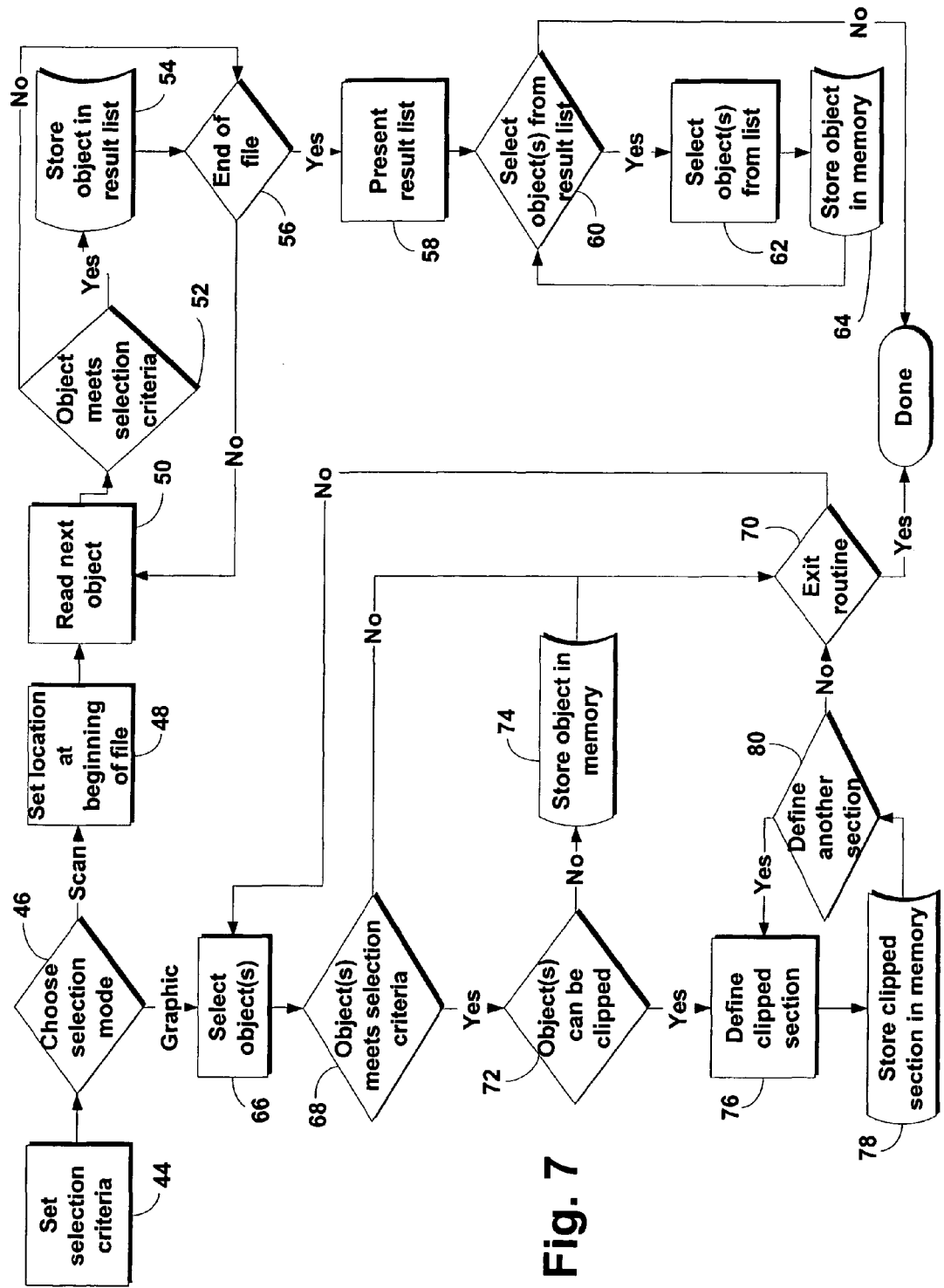

FIG. 7 is a flow diagram illustrating in greater detail the steps in the illustrated embodiment for accomplishing step 36 in FIG. 6, namely, a system and method are provided for selecting objects to be converted and transported. At step 44 the criterion is set to determine which object types may be selected in the selection scheme. In this regard, the user would choose the selection criteria to match the desired object transmission scheme. For example, if the user desired an entity replacement scheme, the selection criteria would be set to entities.

In step 46 the user chooses the desired selection mode for selecting the objects to be converted and transported. One possible selection mode is via scanning and another possible selection mode is via a graphical interface. In the scanning mode, the data associated with the project 10 is scanned by the system for objects that meet the selection/scan criteria set in step 44. In the graphics selection mode, the user manually selects the desired objects to be converted and transported. This can be done by way of a selection device, such as a graphical user interface and a computer mouse.

If the scanning mode is selected at 46, the engineering data associated with the project 10 is scanned at step 48, preferably from the start of the engineering data. In the illustrated embodiment, the data is located in a computer aided design file and represents a plurality of objects. A first object is read at step 50. A decision is made at 52 whether or not the object read at step 50 meets the predetermined selection criteria set at 44. If the object meets the selection criteria, it is stored in a results list at 54.

After the object is stored at 54, or if the object did not meet the scan criteria at 52, the file is checked at its current location at 56 to determine if the end of the file has been reached. If the end of the file has not been reached, the next object is read at 50 and the process is repeated. When the end of the file is reached, the user is presented with a results list at 58 preferably via a user interface. At 60 the user determines if they would like to select objects from the results list to be converted and transported. If objects are to be selected, the user selects the objects at step 62 and they are stored in memory at step 64. Once no further objects are to be selected, the selection process via the scanning method is done.

If the user chose to select objects for conversion and transportation via the graphic selection mode at 46, the objects are selected at step 66. In one embodiment the objects can be selected graphically by using a program which is written to interface with an engineering computer aided design application and a selection device, such as a computer mouse. A determination is made at 68 as to whether the selected object meets the predetermined selection criteria, which was set at 44. If the object does not meet the selection criteria, the user is given the option to exit the routine at 70 or select another object at step 66.

If the object is found to be within the selection criteria at 68, the system determines if the object can be partitioned or clipped at 72. If the object cannot be partitioned, a reference to the object will be stored in memory at step 74 and the user will be asked if they would like to exit the routine at 70. If the object can be partitioned, the user can dynamically define partial sections of the object, via the selection device, at step 76. A reference to each of these partial sections of the object is stored in memory at step 78. The user is then given the option, at 80, to dynamically define another section of the same object at 76, thereby repeating the procedure. If all of the sections of the object are selected and the user therefore wants to exit the section definition routine, the user has the option to exit the graphic selection routine at 70 or select another object at 66. Once all of the desired objects have been selected and stored in memory at 74 or 78, the selection process of the objects to be converted and transported via the graphic selection mode is complete.

Figure 8:
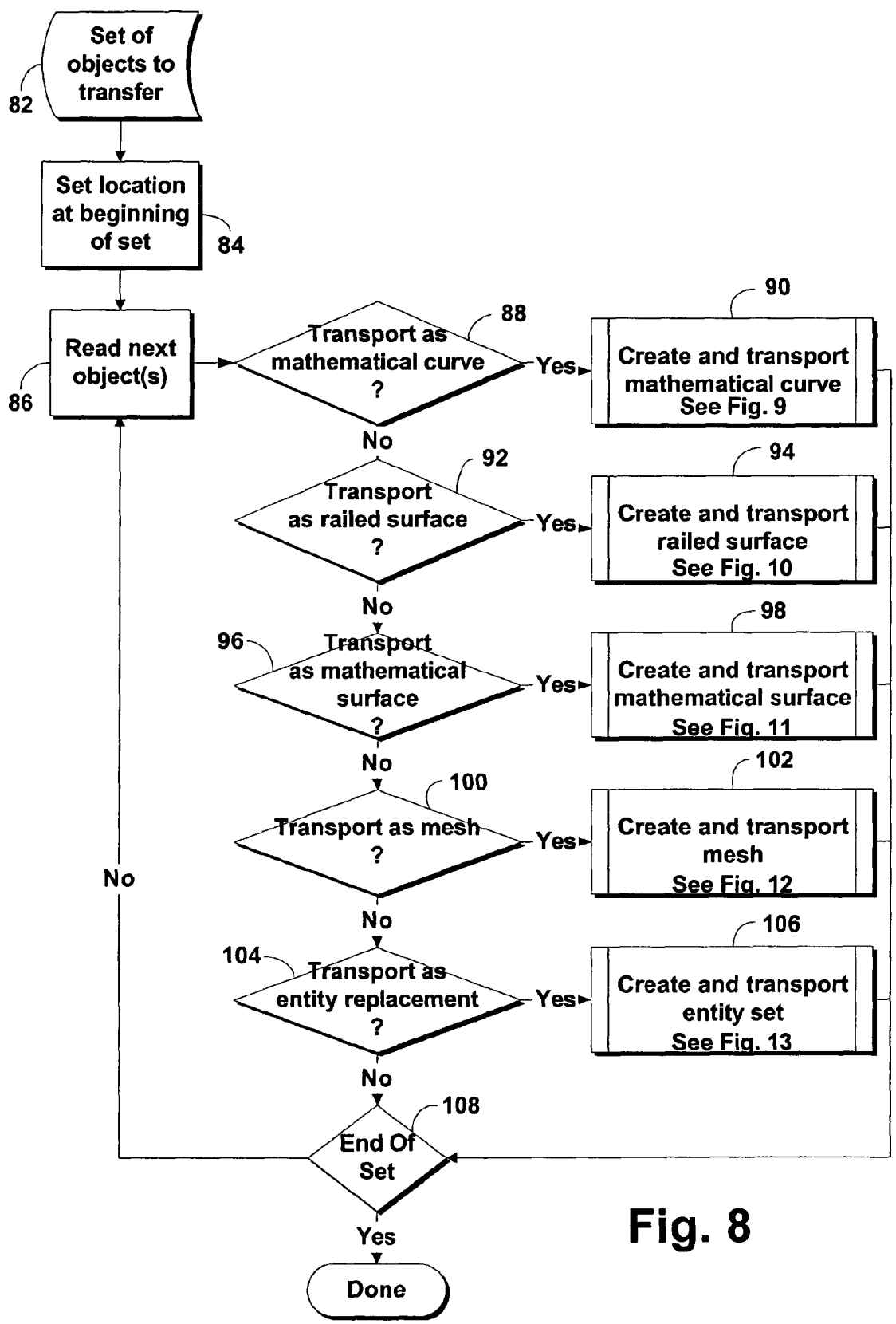

FIG. 8 illustrates a system and method for reading the resulting object transfer set from step 36 (as outlined in detail in FIG. 7) and handling the conversion and transport, and is a more detailed explanation of the steps necessary to accomplish step 38 in FIG. 6. In the illustrated embodiment, the object transfer set contains references to objects of five different types. The method by which a particular object is converted and transported varies depending on its type.

In a first object type the object encapsulates a string of geometric points or line segments which are to be converted into a mathematical curve. As discussed in greater detail below, in the illustrated embodiment the mathematical curve is preferably a non-uniform rational B-spline (NURBS) curve. It should be noted that other types of mathematical curves are within the scope of the present invention.

In a second object type, the object also encapsulates a string of geometric points or line segments which are to be converted into a mathematical curve. However, this object also contains a geometric shape which will be used to extrude a surface along the generated curve or rail. An object of the second type will be transported as a railed surface.

In a third object type, the object encapsulates sets of strings of geometric points or line segments which are to be converted into a mathematical curve set. The curve set can be used to create a mathematical surface. In the illustrated embodiment, a NURBS surface will be created, as described in more detail below. It should be noted that while a NURBS surface is provided in the illustrated embodiment, other types of mathematical surfaces can be used within the scope of the present invention.

In a fourth object type, the object encapsulates triangulated geometric data. This data will be used to generate a mesh surface.

In a fifth object type, the object encapsulates a set of entity data. This set includes entity identifiers and attributes as well as 3D location and rotational data. This information will be used to reference models from 3D libraries and position them in a 3D modeling file.

Looking now at FIG. 8, the set of objects to be transferred resulting from the selection process of step 36 (which is detailed in FIG. 7) are found at 82. An address marker is set at step 84 at the beginning of the object transfer set 82 and is held in memory. At step 86 the reference for the first object is read. The system determines at 88 if the referenced object is to be converted and transported as a mathematical curve. If the determination is true, a mathematical curve object is created from the referenced object's data and the new object is transported, in the illustrated embodiment, to the receiving 3D modeling software application at step 90. Step 90 is described in more detail below and with reference to FIG. 9.

If the determination at 88 is false, i.e., the object is not to be transported as a mathematical curve, the system determines at 92 if the referenced object is to be converted and transported as a railed surface. If it is, a mathematical curve object is created from the referenced object's data, the information regarding the geometric shape is appended and the new object is transported. The steps for converting and transporting the object as a railed surface in step 94 are set forth in greater detail below and with reference to FIG. 10.

If the object is not to be transported as a railed surface, the system determines at 96 if the object is to be transported as a mathematical surface. If the determination is true, the object is converted and transported as a mathematical surface at step 98. Step 98 is described in greater detail below and with reference to FIG. 11.

If the object is not to be transferred as a mathematical surface, the system determines at 100 if the object is to be transported as a mesh at 100. If this determination is true, the object is converted and transported as a mesh at step 102. Step 102 is set forth in greater detail below and with reference to FIG. 12.

If the determination at 100 is false, then a determination is made at 104 if the object is to be transported as an entity replacement. If the determination at 104 is true, the object is converted and transported at step 106. Step 106 is set forth in greater detail below and with reference to FIG. 13.

After an object has been transported at steps 90, 94, 98, 102, or 106 or if all the determinations at 88, 92, 96, 100, or 104 were false, the system checks to see if there are any remaining objects to be transferred in the transfer set 82 at 108. If any objects remain in the transfer set 82, the object is read at 86 and the system proceeds through the procedure for converting and transporting the object as outlined above. When the end of the set has been realized, the conversion and transportation routine is exited.

Figure 9:
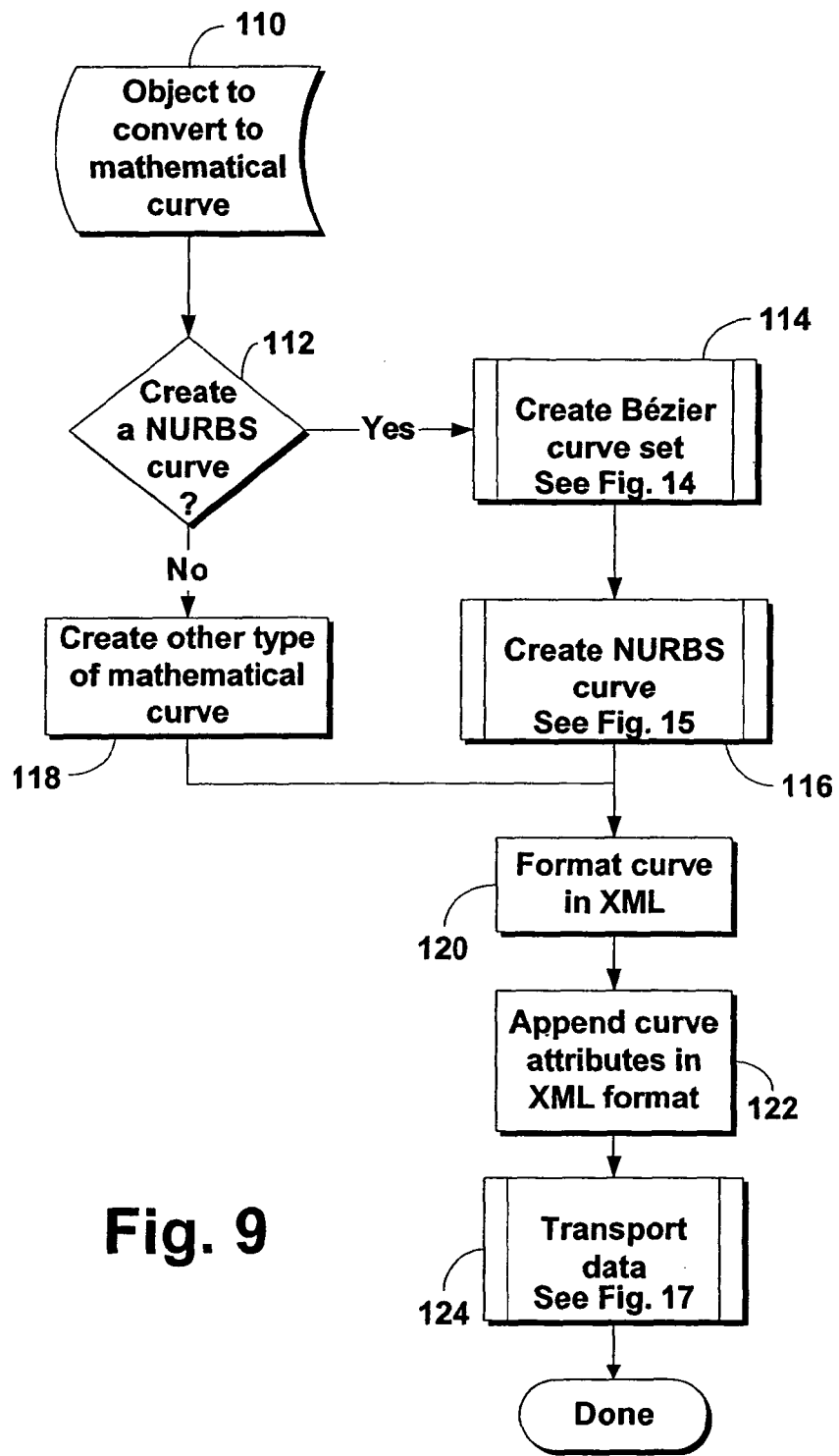

Turning now to FIG. 9, a system and method are provided for converting and transporting an object as a mathematical curve. FIG. 9 depicts one possible embodiment of steps which will accomplish step 90. The object to be converted to a mathematical curve is held in memory and found at 110. The system makes a determination at 112 if the object is to be converted to a NURBS curve. If the determination is true, a Bézier curve set is created from the objects own data at step 114. A method of creating the Bézier curve set at step 114 is discussed in greater detail below with reference to FIG. 14. A NURBS curve is then created at step 116 from the Bézier curve set of 114. A method of creating the NURBS curve of step 116 is set forth in greater detail below with reference to FIG. 15.

If the system determined at 112 that the object 110 is slated for conversion to an alternative type of mathematical curve, the alternative type of mathematical curve would be generated at step 118 from the objects own data. A transfer set is generated at step 120 from the resulting NURBS curve object of 116 or alternate curve object of 118. In the illustrated embodiment, the transfer set is preferably generated in XML format. It should be readily understood that alternate formats could be used and are within the scope of the present invention. Any additional curve attributes are appended to the transfer set, again preferably in XML format, at step 122. Such additional curve attributes could include the color or style the curve should have when it is generated in the 3D modeling application. The curve transfer set is then transported to a receiving program at step 124. In the illustrated embodiment, the receiving program is a software component written to interface with a 3D modeling application.

Figure 10:
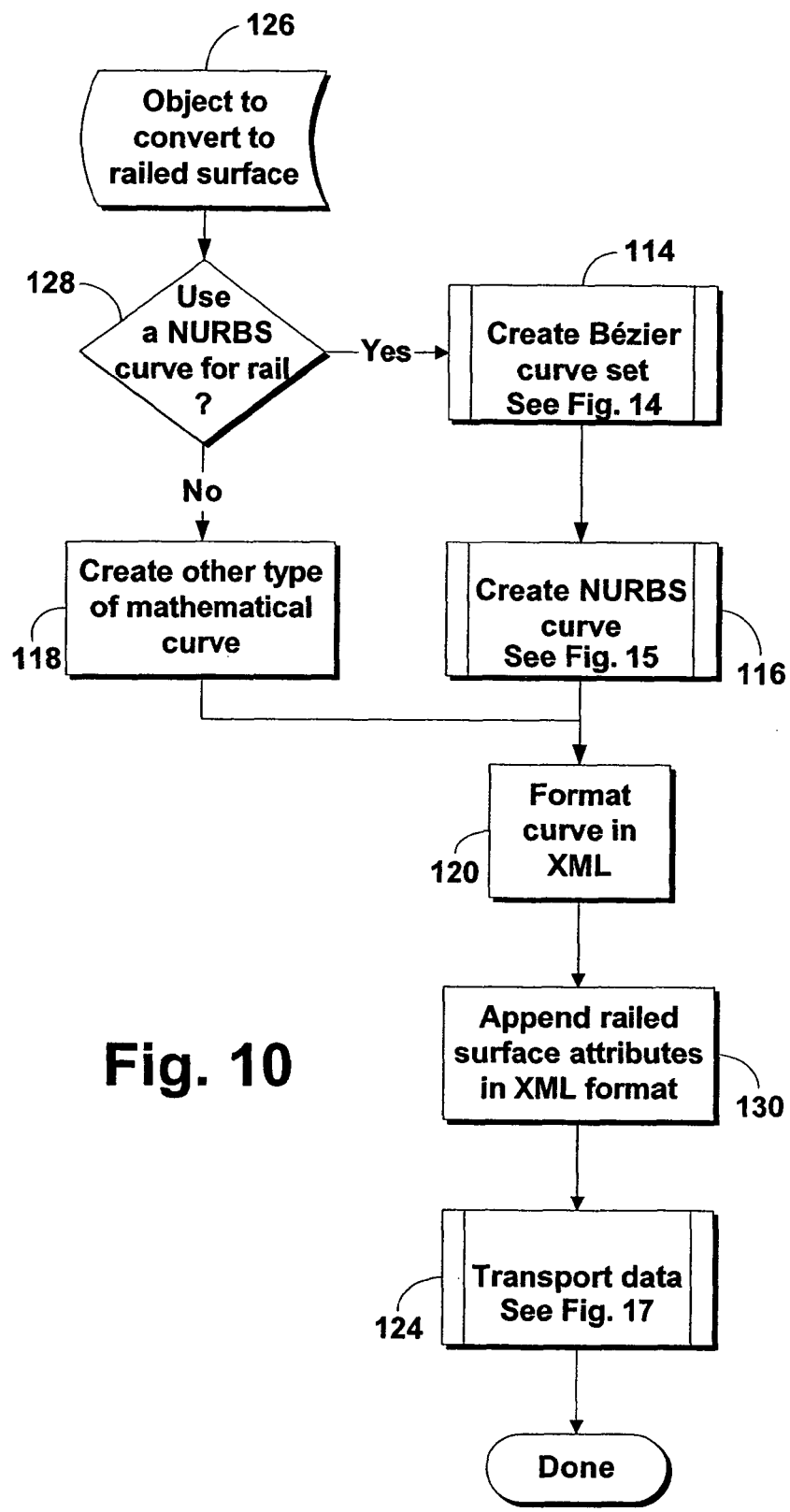

FIG. 10 sets forth an embodiment of a system and method for handling the conversion and transportation of a railed surface and provides a more detailed explanation of step 94. The object which is to be converted to a railed surface is held in memory at 126. The system then determines at 128 if the object is slated for conversion to a NURBS curve. If the determination is true, a Bézier curve set is created from the object's own data at step 114. Step 114 in FIG. 10 is the same step as step 114 in FIG. 9. Step 114 is explained in greater detail below with reference to FIG. 14. As various steps are described in greater detail below, those steps that are essentially identical to steps which have already been described will be referenced with the corresponding reference numeral for ease of description. The Bézier curve set from step 114 is used at step 116 to create a NURBS curve at 116. Step 116 is described in greater detail below with reference to FIG. 15.

If the system determined that object 126 is slated for conversion to an alternate type of mathematical curve at 128, the alternate type of mathematical curve would be generated, at 118, with the object's own data. A transfer set is generated at 120 from the railed surface object which, at this point, encapsulates either a NURBS or alternative mathematical curved object. In the illustrated embodiment, the transfer set is formatted in XML. As discussed above, the transfer set could be formatted in an alternate format. At step 130, the geometric shape which will be used to extrude a surface along the generating curve or rail is appended to the transfer set. Again, this information is preferably appended to the transfer set in XML format. Additionally, additional attributes can be appended to the transfer set at 130. The curve transfer set is then transported at 124 to a receiving program. In the illustrated embodiment, the receiving program is a software application written to interface with a 3D modeling software application. The transport step 124 is described in greater detail below with reference to FIG. 17.

Figure 11:
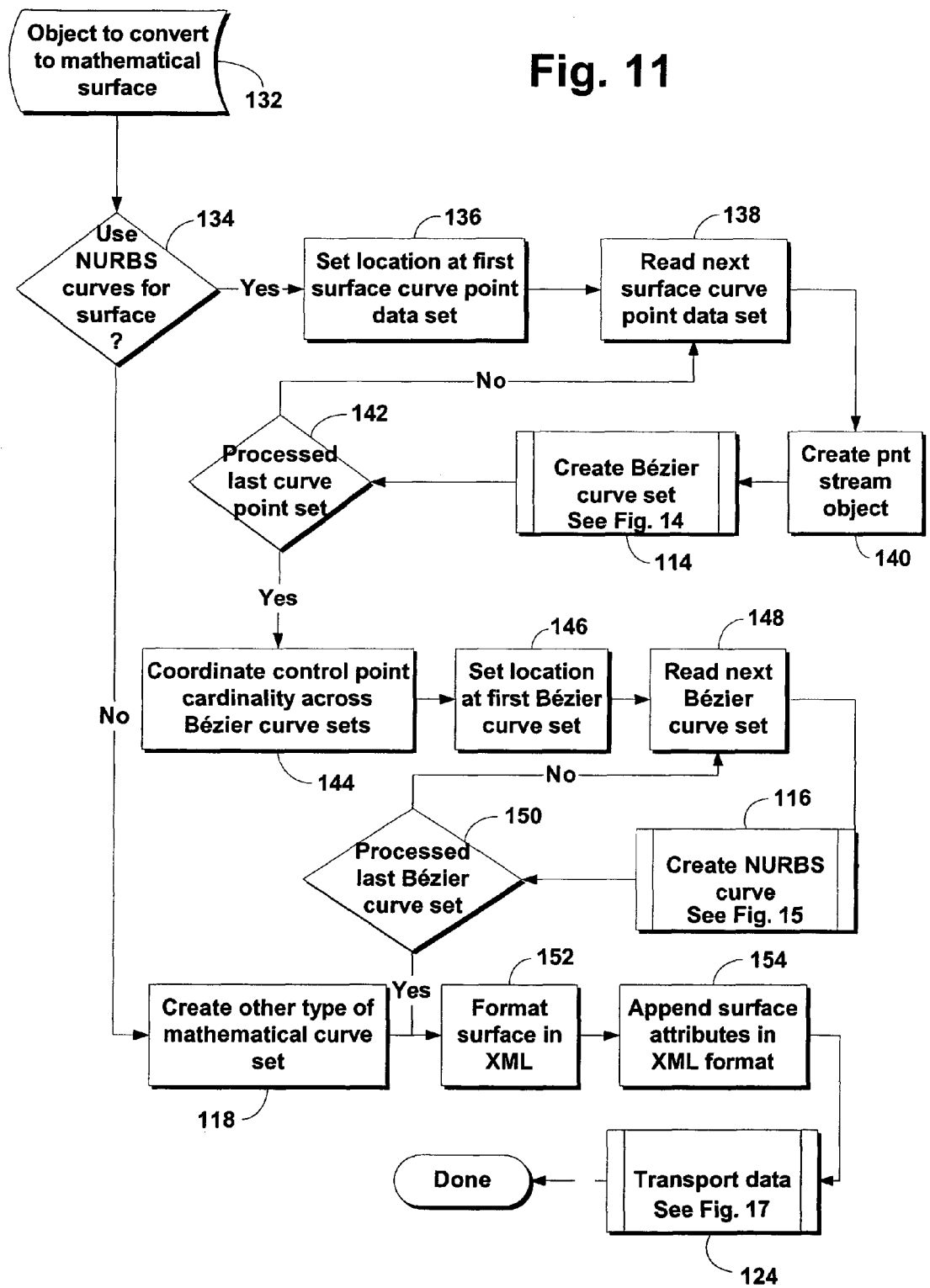

FIG. 11 describes step 98 of FIG. 8 in greater detail and provides an embodiment of a system and method for handling the conversion and transport of a mathematical surface. The object that is to be converted to a mathematical surface is held in memory at 132. The system determines, at 134, if the object 132 is slated for conversion to a NURBS surface. If the decision is true, an address marker is set at the beginning of the curve point data set which is encapsulated by the object 132 and held in memory at 136. A first curve point data set is read at step 138. A point stream object is then created from the data in the curve point data set at 140. A Bézier curve set is then created, at step 114, by evaluation of the point stream object. The system then checks at 142 to see if there are any remaining curve point data sets. If there are items remaining, the procedure is repeated by reading the next curve point data set at 138. Once the end of the set has been realized, the number of control points across all of the Bézier curve sets is evaluated at 144 and, if necessary, adjustments are made to keep cardinality equal.

An address marker is set at step 146 at the beginning of the first Bézier curve set which is held in memory. The first Bézier curve set is read at 148 and a NURBS curve object is created from the data in the Bézier curve set at 116. Step 116 is described in greater detail below with reference to FIG. 15. The system then checks at 150, to see if there are any remaining Bézier curve sets. If there are, the procedure is repeated by reading the next Bézier curve set at 148. This procedure is repeated until the system determines, at 150, that the last Bézier curve set has been converted to a NURBS curve at 116. If the system determines, at 134, that the object 132 is slated for conversion to a curve surface other than a NURBS surface, the alternate type of mathematical curve surface is generated from the object's own data at 118.

A transfer set is generated at step 152, preferably formatted in XML, from the surface object which, at this point, encapsulates either a NURBS surface or alternative curve surface object. Additional attributes are appended to the transfer set, preferably in XML format, if necessary, at 154. The curve surface transfer set is then transported to a receiving program at step 124. In the illustrated embodiment, the receiving program is a software application which interfaces with a 3D modeling application. Step 124 is described in greater detail below with reference to FIG. 17.

Figure 12:
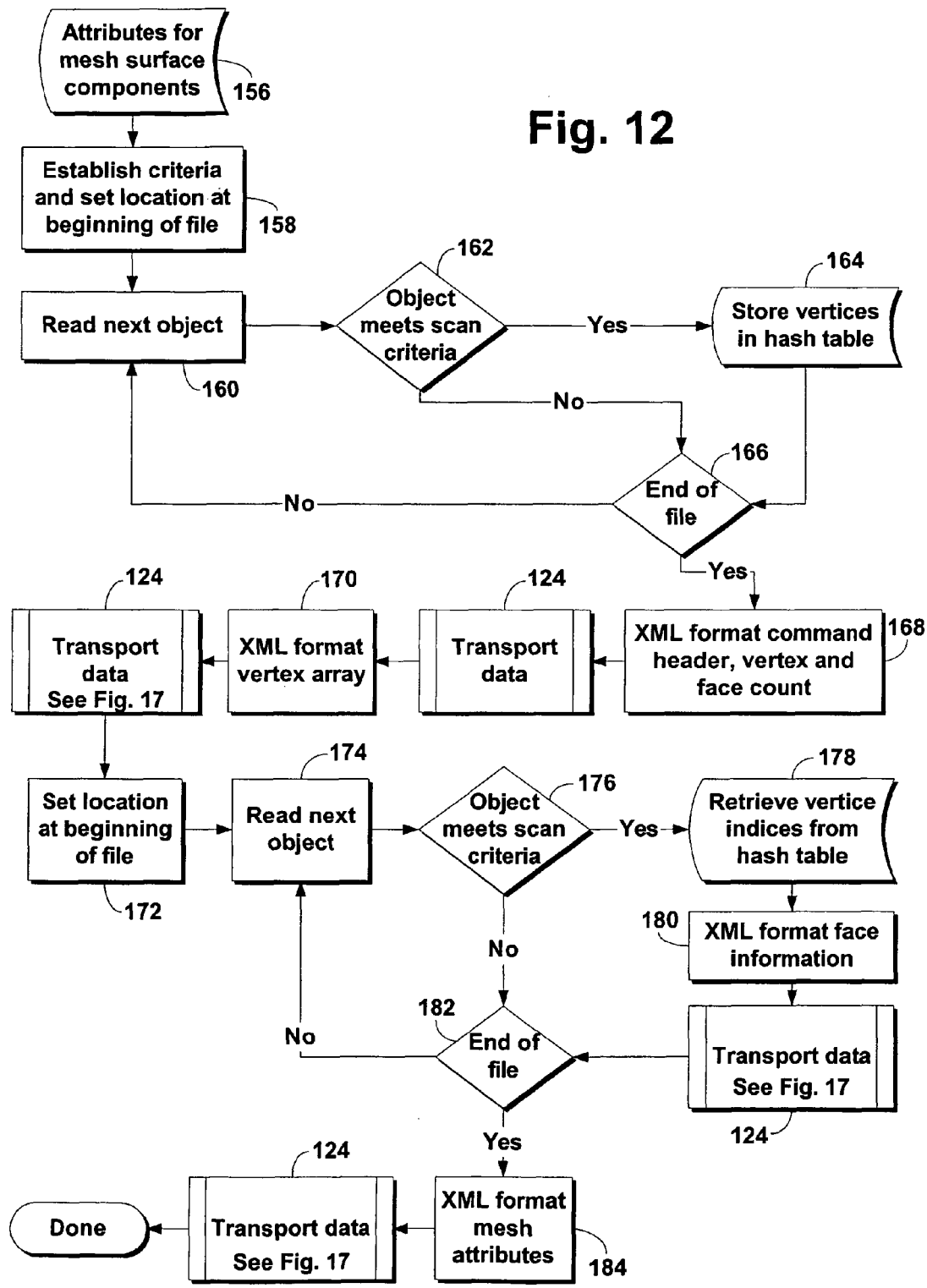

Turning now to FIG. 12, an embodiment of a system and method for handling the conversion and transport of a mesh surface is illustrated and is a more detailed explanation of step 102 of FIG. 8. In the illustrated embodiment, two scans are required of the engineering design file to gather the necessary data to generate a mesh surface. In particular, the items of interest will be triangle objects which meet a previously established scan criteria. Preferably the initial scan collects information concerting the vertices of those triangles. A vertex which is referenced by multiple triangles is reduced to a single hash table entry. Once the initial scan is completed, the hash table will be loaded with every vertex needed to generate the mesh surface. Each vertex entry is indexed in the hash table by a unique value. A second file scan is then conducted to match a particular triangle object with its vertex hash table indices. Because the amount of data associated with these mesh surfaces can be very large, in the illustrated embodiment, the data associated with the first scan is transmitted simultaneously while the second file scan is still in progress. By sending the data in parts, the amount of data is reduced to manageable chunks, thereby eliminating the possibility of exceeding the system's memory capability by trying to handle all of the data at once. Additionally, the amount of time required to complete the process is reduced significantly since the sending system is still scanning the file while the receiving system is already in process of constructing the surface in the 3D modeling application, as discussed in greater detail below.

Generally the selected object, i.e. the object to be transported as a mesh surface, is comprised of a plurality of objects. Attributes of these objects to be transported together as a mesh surface are held in memory at 156. The system evaluates the attributes of the mesh surface components 156 at step 158. The attributes are information concerning criteria that will be used to search for objects that will be used to construct a mesh surface. The initial scan is started by locating the beginning of the engineering computer aided design file at 160 and reading the contents of a first object. The system determines, at 162, if the object meets the scan criteria. If the determination is true, the object's vertices are stored in a hash table. Once the vertices have been stored, or if the object didn't meet the scan criteria at 162, the current file location is checked to determine if the end of the file has been reached at 166. If there are still objects remaining in the file, the next object is read at 160 and the routine is continued.

Once the end of the engineering design file is reached, a transfer set is generated at step 168. The transfer set contains a command header and a count of vertices and faces. The transfer set is preferably formatted in XML. The transfer set is then transported to a receiving program at 124. As stated before, the receiving program preferably interfaces with a 3D modeling application and the steps associated therewith are discussed in greater detail below with reference to FIG. 17. At step 170, the array of vertex information is generated from the information that was previously stored in the hash table. A transfer set containing a vertex array is then generated, preferably in XML format. The transfer set is then transported to the receiving program at 124.

The second file scan is preferably initiated by locating the beginning of the engineering computer aided design file at step 172. The contents of the first object are read at step 174 and a determination is made, at 176, if the object meets the scan criteria. If the determination is true, the object's vertex indices are retrieved from the hash table at 178. A transfer set containing face information is generated at 180, preferably formatted in XML. This transfer set is transported to a receiving program at step 124. Once the face information has been transported, or if the object didn't meet the scan criteria at 176, the current file location is checked to determine if the file end has been reached at 182. If there are still items remaining in the file, the next object is read, at 174, and the routine is continued until the end of the file is reached and the determination at 182 is true. Once the end of the file is reached, a transfer set is generated at 184, preferably formatted in XML. The transfer set contains any additional mesh attributes which might be necessary. The transfer set is then transported at 124 to the receiving program.

Figure 13:
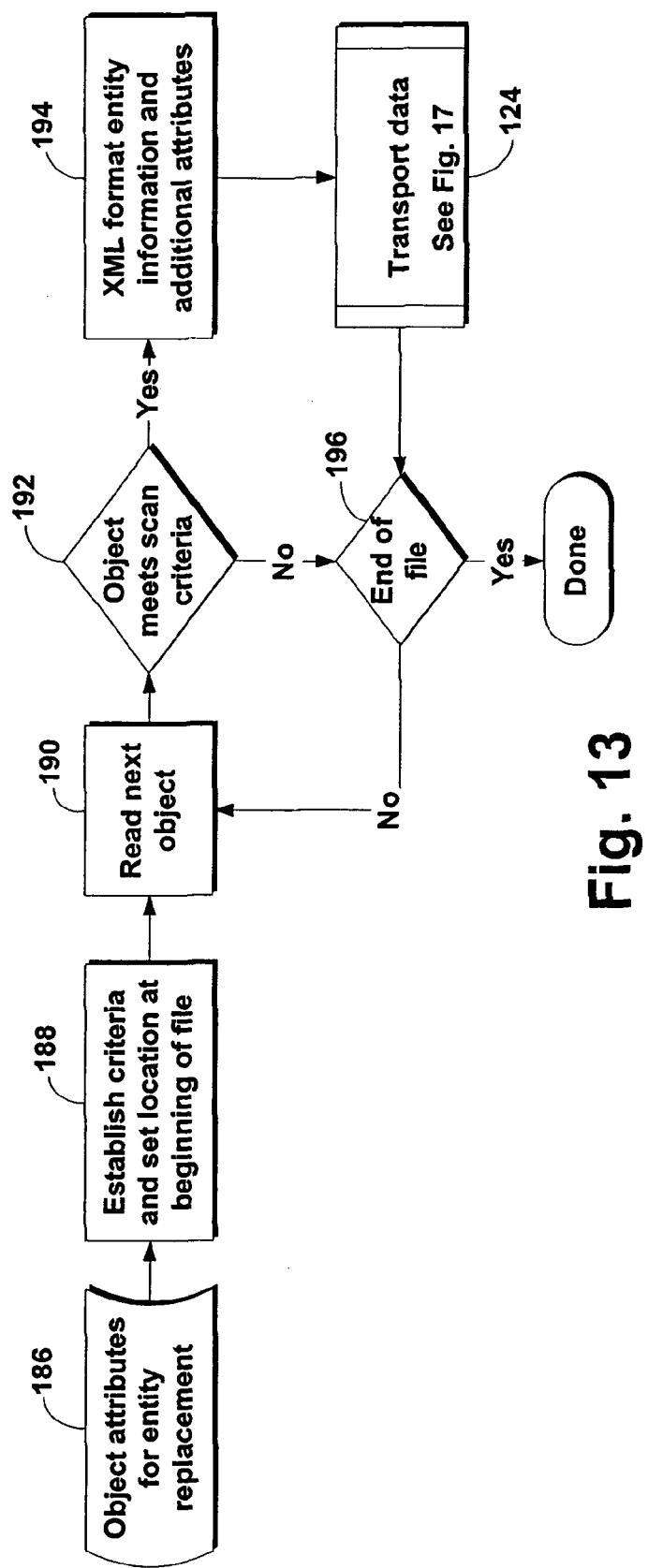

FIG. 13 illustrates an embodiment of a system and method for handling a conversion and transport of entity replacement commands and is a more detailed illustration of step 106 of FIG. 8. Initially, to gather the data needed to transport entity replacement commands, a scan of the engineering design file should be performed. The items of interest during the scan are entities which meet a previously established criteria, e.g. entity name, associated group, layer, etc. When an object meeting these scan criteria is encountered, the data associated with the object will be transmitted simultaneously while the file scan is still in progress. Thus, while the sending system is still in the process of locating objects, the receiving system will already be issuing the entity replacement command in the 3D modeling application.

The object to be transferred as an entity replacement is found at 186 and is held in memory. At step 188, the system evaluates the object 186. The object 186 holds information concerning criteria that will be used to search for other objects that will be used to construct the entity replacement commands. The file scan is preferably started at step 190 by locating the beginning of the engineering computer aided design file and reading the contents of the first object. The system determines, at step 192, if the object meets the scan criteria. If the determination is true, a transfer set containing the entity attributes is generated at 194, preferably formatted in XML. The transfer set is then transported to the receiving program at step 124. As discussed above, the receiving program preferably interfaces with a 3D modeling application in the illustrated embodiment of the present invention. Once the transfer set has been transported, or if the object 186 didn't meet the scan criteria at 192, the current file location is checked to determine if the file end has been reached at 196. If there are still items remaining in the file, the next object is read, at step 190, and the routine is continued until the file end is reached and the determination at 196 is true.

Figure 14:
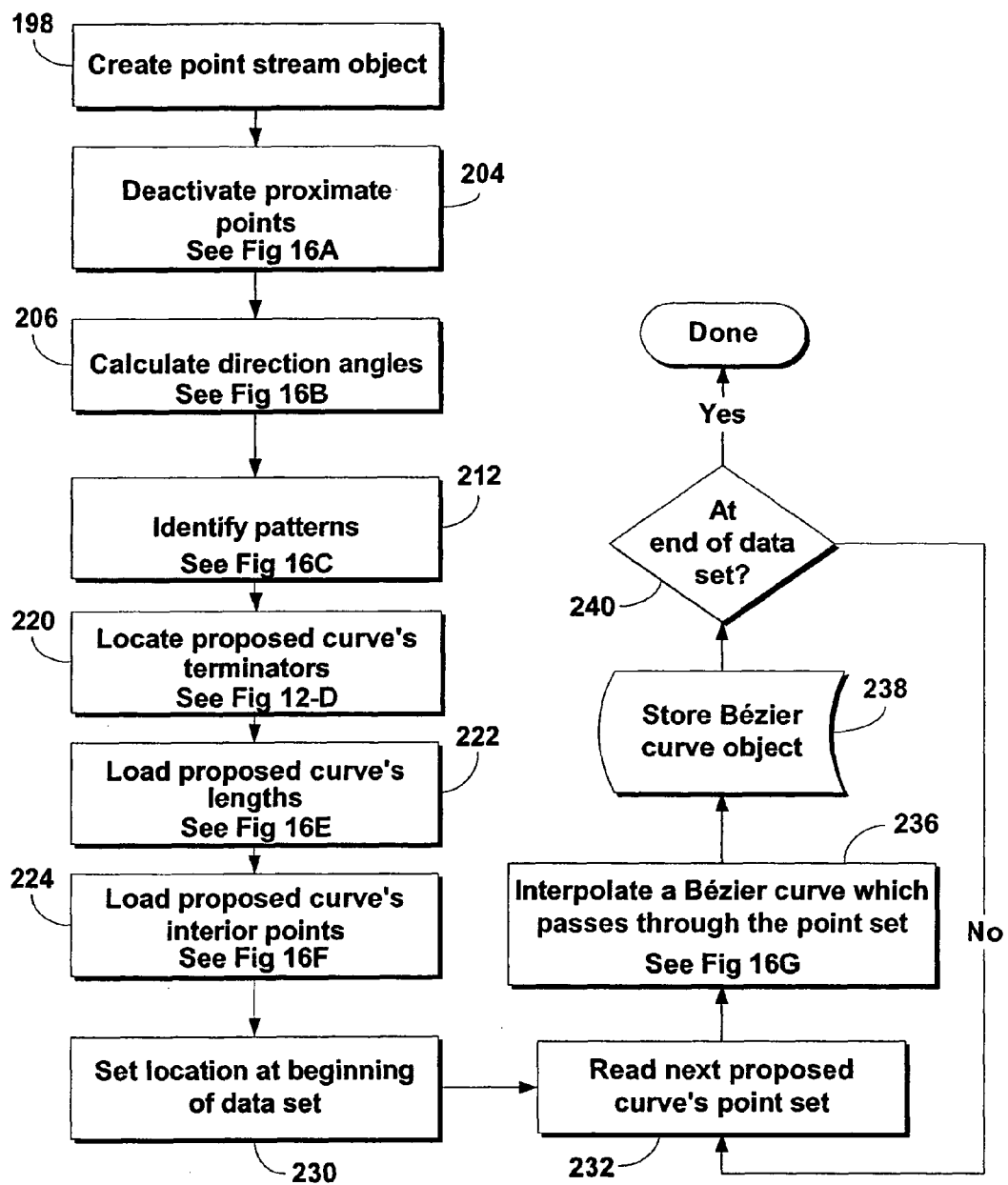
Figure 16B:
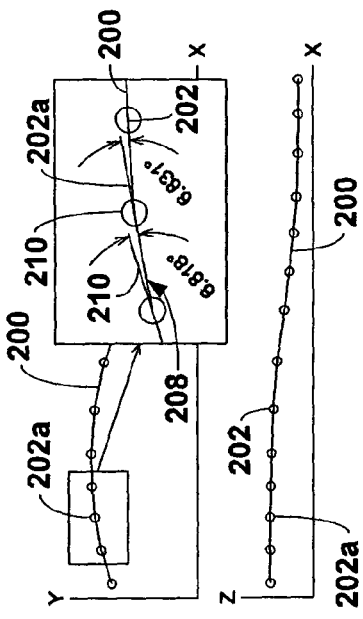
FIG. 16A-H are schematic diagrams illustrating various steps in the disclosed embodiment of a method of erecting a Bézier curve set.
Figure 16D:
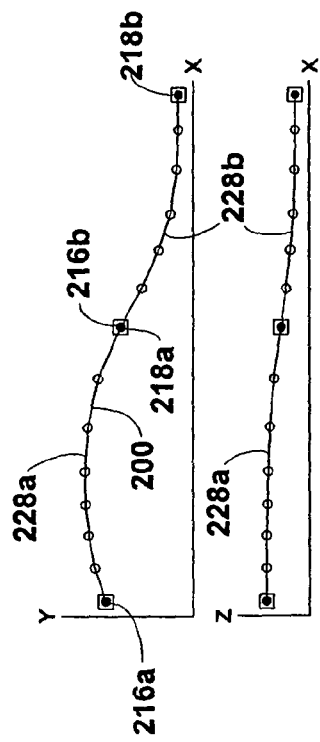
Figure 16A:
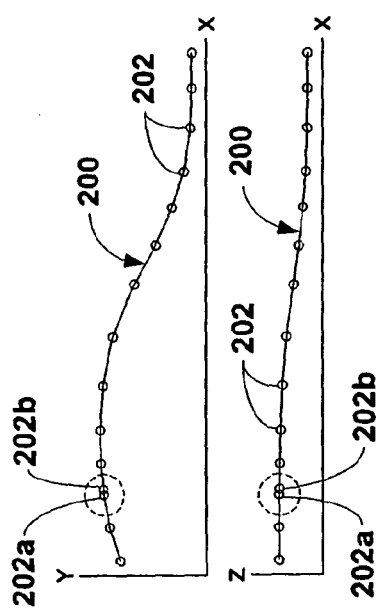

FIG. 14 illustrates an embodiment of a system and method for creating a Bézier curve set and is a more detailed illustration of step 114. Initially, at step 198, a point stream object 200, as illustrated schematically in FIG. 16A, is created from a set of ordered points 202. The set of ordered points 202 are held in memory and are defined by the engineering data associated with the object 110, 126, 132 that is being converted. At step 204, a proximate point evaluation is applied to the point stream object 200 to ensure that no two points 202 are within a specified minimum distance from each other. If a point 202 is found to be too close to another point, that point 202 will be deactivated. For example, in FIG. 16A, point 202b is found to be too close to point 202a (in the highlighted area) and is therefore eliminated from the point stream object 200 as illustrated in FIG. 16B. At 206, direction angles 208 are calculated for each vector 210 with respect to the previous vector 210. In this regard, a vector 210 is the line formed connecting two sequential points 202, as best illustrated in the enlarged area of FIG. 16B. In the example illustrated in FIG. 16B, a first angle 208 is 6.818° and a second angle 208 is 6.831°. Two direction angles 208 are calculated for each vector 210. First is the angle formed in the XY plane and the second is the angle formed in the YZ plane.

Figure 16C:
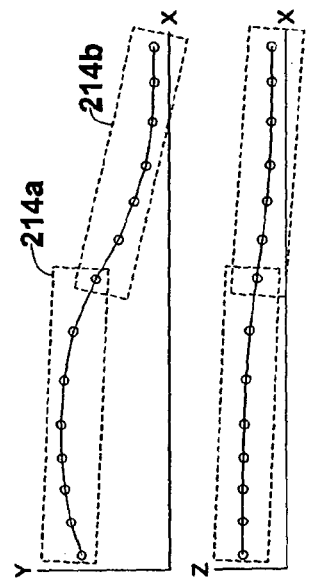

At step 212, the point stream object 200 and its associated vector direction angles 208 are analyzed to determine if any patterns 214 exist. Resulting patterns 214 are then identified. FIG. 16C illustrates two patterns which have been identified as 214a and 214b. A pattern is defined as a consistent direction change identified by changes in angles 208 being less than a minimum specified angle amount. In other words, the direction change angle is allowed to consistently increase or decrease only if it falls within a specified rate tolerance. Direction patterns are identified in both the XY and YZ planes. Each identified pattern represents a proposed curve 228. Based upon the patterns 214 that are identified, begin and end points 216, 218 (in FIG. 16D), respectively, or terminators are identified for each proposed curve in step 220. Once these terminators are identified, the length of each proposed curve is determined at step 222, as illustrated in FIG. 16E. The length of each proposed curve its the distance between its terminators (i.e., the distance between the begin point 216 and end point 218 of each proposed curve 228).

Figure 16F:
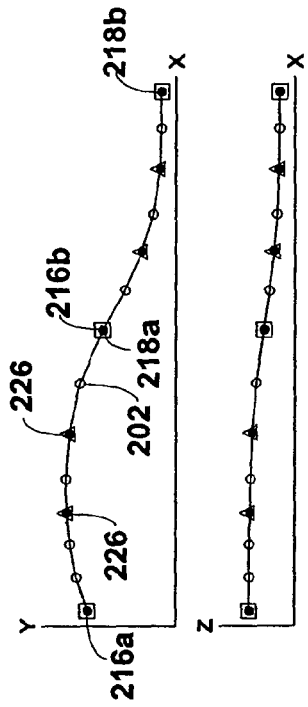
Figure 16E:
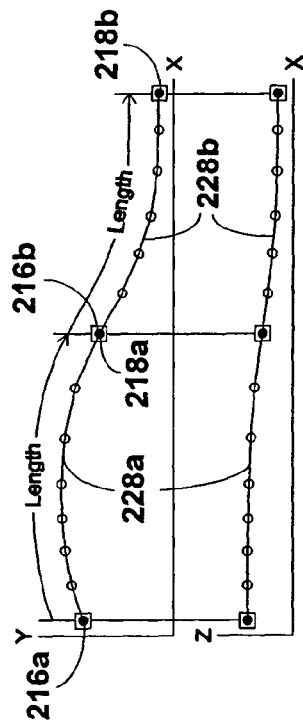

At step 224, which is illustrated in FIG. 16F, interior points 226 are located for each proposed curve 228. In the illustrated embodiment, the proposed curves 228 are being created as cubic Bézier curves 229. Consequently, a total of four points 202 are needed for each Bézier curve 229. The points for each Bézier curve 229 are the beginning point 216, the end point 218 and two interior points 226. It should be noted that, while the illustrated embodiment uses cubic Bézier curves, alternate mathematical curves could be used.

In a Bézier curve, every point $p_i$ has a parameter value $t_i$ associated with it. In a cubic Bézier curve, a natural choice for this parameter value is $t_i = i/3$. According to the cord length parameters method, the interior points 226 should be at ⅓ the length of the curve 228 and ⅔ the length of the curve 228. Accordingly, at step 224, the system checks to see if points 202 already exist at these increments. Because of the likelihood of having two existing points which satisfy this requirement is extremely small, a tolerance window can be used to allow already existing points 202 close to these locations to be used. The tolerance window will have a negligible effect on the curve approximation outcome as a result of the use of a parameter scaling method to normalize the parameter values:

$$t_i = \frac{t_i - t_0}{t_l - t_0}.$$

If already existing points 202 are not found within the specified window or if no points 202 exist between the proposed curve's terminators 216, 218, then points 202 are inserted at ⅓ length and ⅔ length as needed. Once all of the interior points 226 have been determined for each of the proposed curves 228 along the entire point stream object 200, then a Bézier curve 229 is created for each proposed curve 228. The Bézier curves 229 are interpolated using the standard form:

$$\begin{bmatrix} p_0 \\ p_1 \\ p_2 \\ p_3 \end{bmatrix} = \begin{bmatrix} B_0^3(t_0) & B_1^3(t_0) & B_2^3(t_0) & B_3^3(t_0) \\ B_0^3(t_1) & B_1^3(t_1) & B_2^3(t_1) & B_3^3(t_1) \\ B_0^3(t_2) & B_1^3(t_2) & B_2^3(t_2) & B_3^3(t_2) \\ B_0^3(t_3) & B_1^3(t_3) & B_2^3(t_3) & B_3^3(t_3) \end{bmatrix} \begin{bmatrix} b_0 \\ b_1 \\ b_2 \\ b_3 \end{bmatrix}$$

Figure 16H:
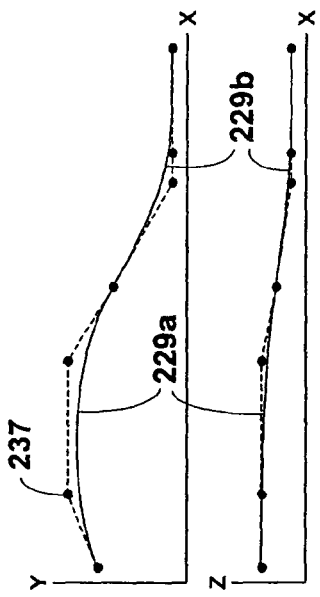
Figure 16G:
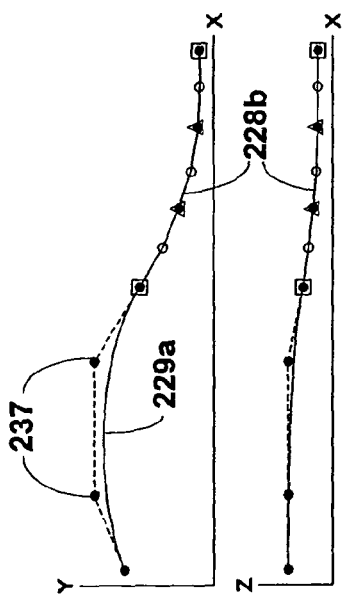

At step 230, an address marker is set to the beginning of the proposed curves' data, which is held in memory. At step 232, the data concerning the first proposed curve 228a is read. A Bézier curve 229a is interpolated at step 236 from this data, as illustrated in FIG. 16G. Once the Bézier curve 229a is interpolated, control points 237 exist. The control points 237 influence the shape of the Bézier curve 229a and produce a Bézier curve 229a which passes through the interior points 226. With the control points 237 present, the interior points 226 are no longer needed and are discarded. The new Bézier curve 229a is stored in memory at step 238. At 240, the system determines if there is any remaining curve data to be interpolated. If there is, the next proposed curve's data is read at 232 and the process is continued until all the necessary Bézier curves 229 have been interpolated, as illustrated in FIG. 16H, and stored in memory. FIG. 16H illustrates two Bézier curves 229, which have been used to construct a NURBS curve.

Figure 15:
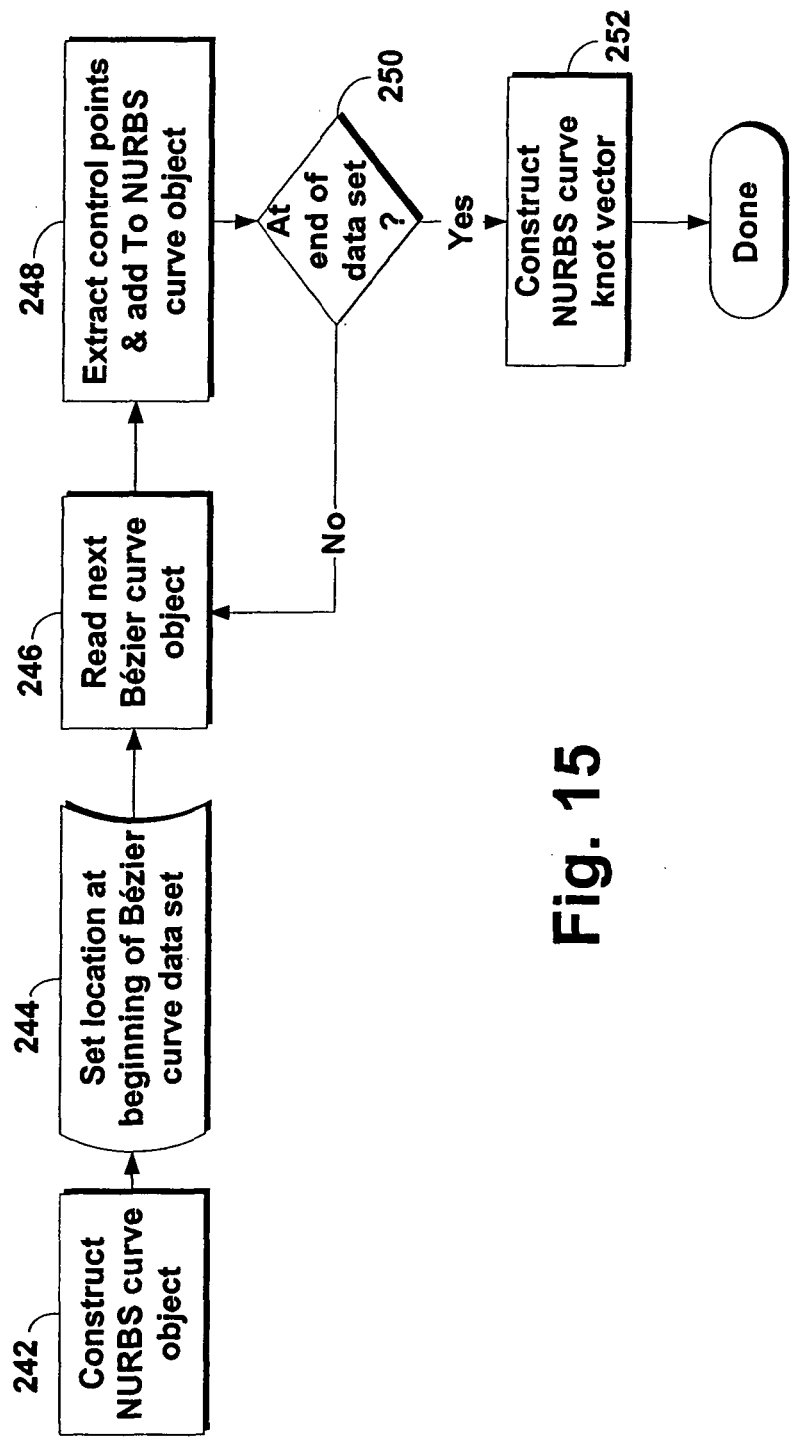

Turning now to FIG. 15, an embodiment of a system and method for constructing a NURBS curve is illustrated. FIG. 15 is a more detailed explanation of step 116 of FIGS. 9, 10 and 11. At step 242, a NURBS curve object is created which is void of any geometry information. At step 244, an address marker is set to the beginning of the Bézier curve set which is held in memory. The first Bézier curve 228 of the Bézier curve set is read at step 246. The control point information is then extracted, at step 248, from the Bézier curve 228 and appended to the NURBS curve object. The system makes a decision at 250 if any unread Bézier curves 228 remain in the Bézier curve set. If some remain, the next Bézier curve 228 in the set is read at 246. The process is repeated until the control points have been extracted from all of the Bézier curves 228 in the Bézier curve set. Once all of the control points have been extracted, the NURBS curve knot vector is created at step 252, thus completing the generation of a NURBS curve that represents the object desired to be transferred and is based on the engineering data associated with the particular object.

Figure 17:
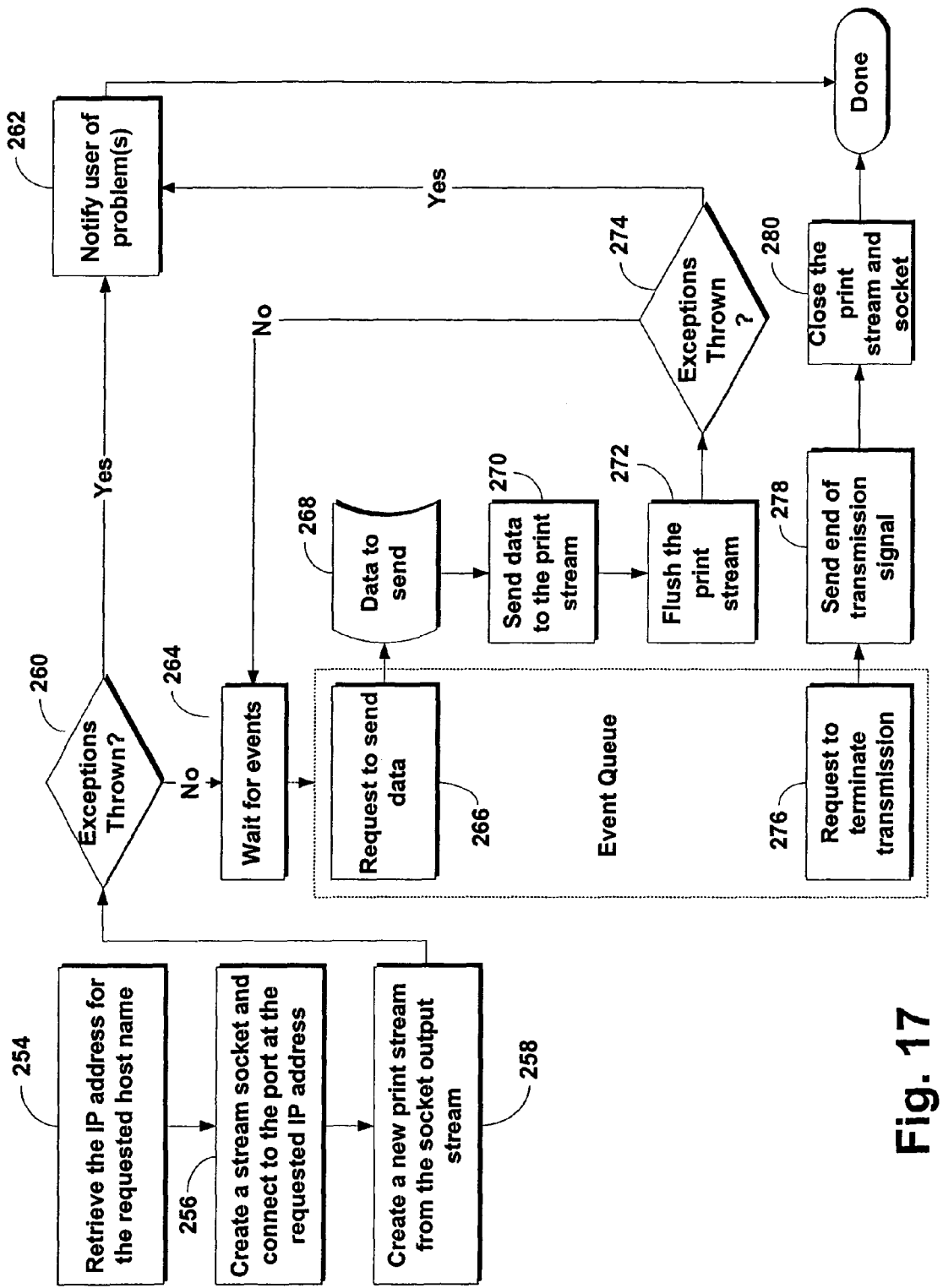

FIG. 17 illustrates an embodiment of a system and method for sending data. FIG. 17 is a more detailed explanation of steps which will accomplish part of step 124 of FIGS. 9-13. Initially, a user provides a host name for the destination of the data. An IP address is then retrieved at step 254 for the requested host name. A stream socket is then created and a connection is made, at step 256, to a specified port at the requested IP address. Step 256 is illustrated schematically in FIG. 21A. At step 258, a new print stream is created from the socket output stream. The system checks at 260 to see if any exceptions were thrown during the connection process. If there were exceptions, the user is notified at 262 and the process is terminated. If the connection was successful and no exceptions were thrown, the system waits for a specific event at 264 which will determine any further execution.

One possible event is a request to send data. At step 266, a request is received to send data. This request is accompanied by the data 268 to be sent. The request is generated during the execution of step 124 of FIGS. 9-13. The data to be sent is held in memory at 268 and is sent to the print stream at step 270. Once the data is sent, the print stream is flushed at 272. The system then checks, at 274, for any exceptions that were thrown during the data transmission process. If there were exceptions, the user is notified at step 262 and the process is terminated. If the data transmission was successful, the system returns to step 264 and waits for specific events which will determine any further execution.

Another possible event is a request to terminate the transmission. At step 276, a request is received to terminate the transmission. When this notification is received, an end of transmission signal is sent at step 278, the print stream and socket are closed at 280 and the process is terminated.

Figure 18:
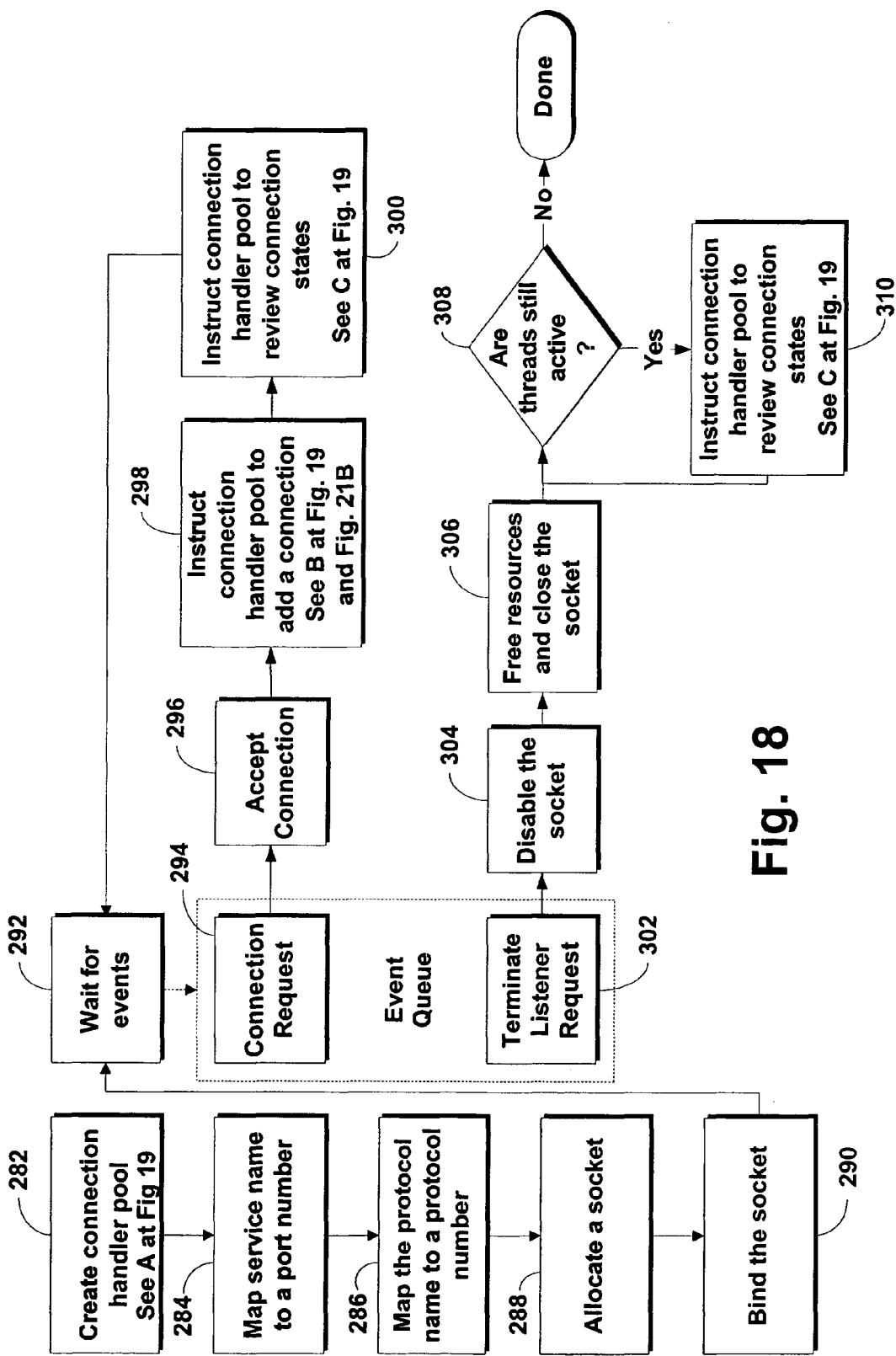

FIG. 18 illustrates an embodiment of a system and method for receiving data. FIG. 18 is a more detailed explanation of part of step 40 and, in the illustrated embodiment, is part of a receiving program which interfaces with the 3D modeling software application 28. Initially, a listening service is created that will respond to client connection requests. To accomplish this, a connection handler pool is created at step 282 which will contain all of the connection handlers. Next, at step 284, the specified service name is mapped to a port number. The specified protocol name is mapped at 286 to a protocol number. A socket is then allocated at 288 and it is bound at 290. The system then waits for specific events which will determine any further execution at step 292.

One possible event is a request to connect. At step 294, a request is received to establish a connection with the receiving program. Step 294 is illustrated schematically in FIG. 21A. The connection request is accepted at step 296 and the connection handler pool is instructed to add a new connection at step 298. Step 298 is illustrated schematically in FIG. 21B. A new connection handler object is assigned to handle all of the communications for the new connection until the transmission is terminated. This connection handler will run in a separate system thread so that once a new thread is created and started, the listening service of the receiving program can continue to listen for new events simultaneously while data is being received by this new connection handler. This operation is illustrated schematically in FIG. 21C. At step 300, the connection handler pool is instructed to review the connection handler states (i.e. check for and clean up the inactive handlers) and the system returns to a state of waiting for specific events at step 292.

Another possible event is a request to terminate the listener. At step 302, such a request to terminate the listener is received. At step 304, the socket is disabled and at step 306 the socket is closed and all related resources are freed. The system checks for any remaining active threads at step 308. If any active threads are found, the connection handler pool is instructed to review the connection handlers at step 310. The system will continue to check for active threads until none are remaining. At this point all connection transmissions have completed and the listening service is terminated.

Figure 19:
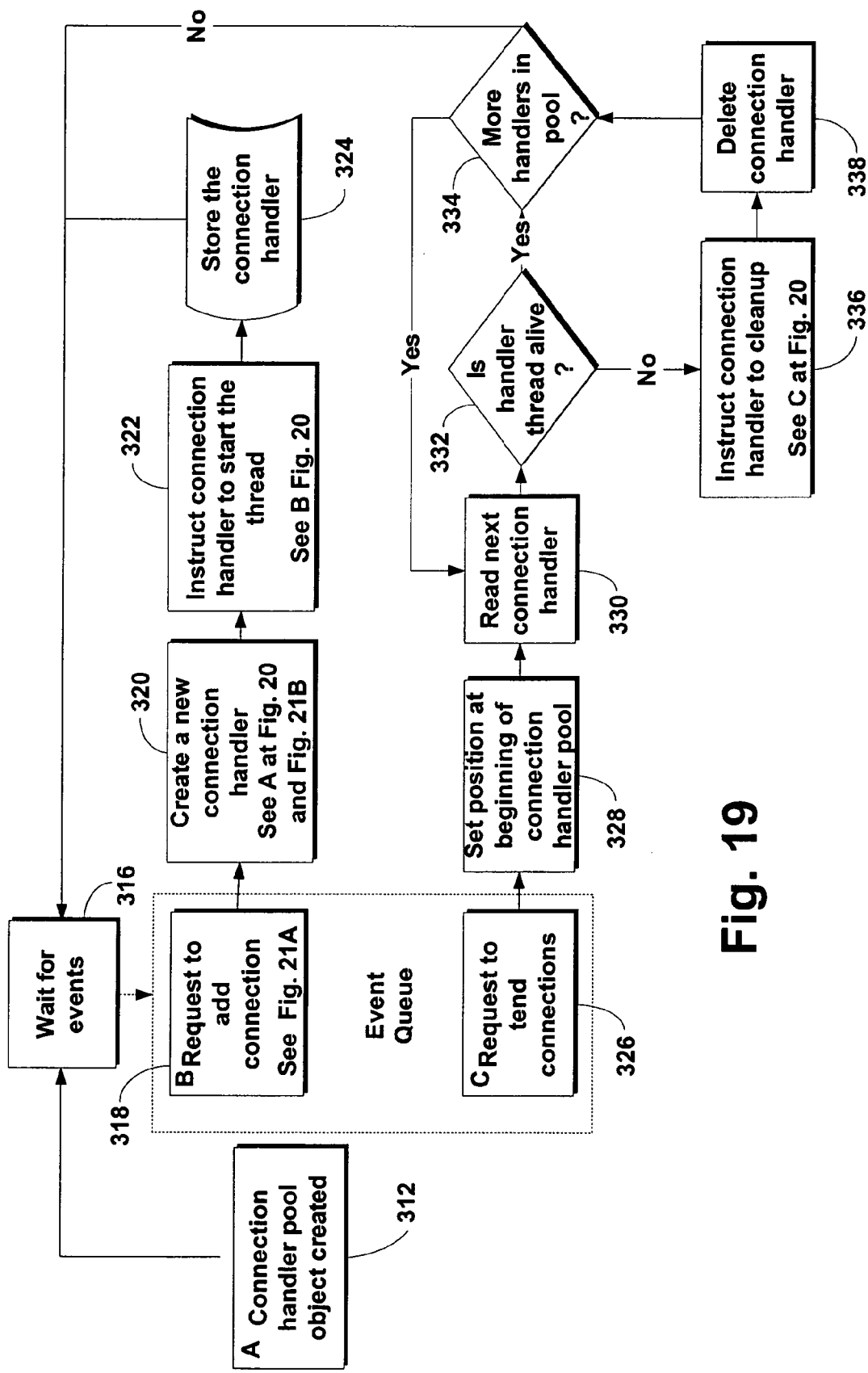

FIG. 19 illustrates an embodiment of a system and method for managing connection handlers. Initially, a connection handler pool object is created at step 312. At step 316, the system waits for specific events which will determine any further execution.

One possible event is a request to add a connection. Such a request received at step 318. Step 318 is illustrated schematically in FIG. 21A. A new connection handler is then created at step 320. Step 320 is illustrated schematically at FIG. 21B. Step 320 is also illustrated in greater detail at A in FIG. 20. At step 322, the connection handler is then instructed to start the execution of a new thread as further illustrated at B in FIG. 20. A reference to the new connection handler is then stored in memory, at step 324, and the system resumes waiting for specific events at step 316.

Another possible event that could occur while waiting for events at 316 is a request to review connections. In response to this request, the system cleans up and deletes any inactive connection handlers in the pool. At step 326, a request is received to review the connections. In response, an address marker is set to the beginning of the connection handler pool, at step 328, which is held in memory. The first connection handler's data is then read at step 330. The system then makes a determination regarding the handler's activity status at 332. If the handler is found to be active, the system checks to see if there are any more remaining handlers in the connection handler pool at 334. If there are, the system reads the next connection handler at 330. If there are no more handlers in the pool, the system returns to the waiting state of step 316.

If the system determines, at 332, that the handler thread is inactive, the system is instructed, at step 336, to clean up the connection handler and the connection handler is then deleted at step 338. A determination is then made at 334 if there are any remaining connection handlers in the connection handler pool. This process is repeated until all connection handlers have been checked. Once all connection handlers have been checked, the system resumes waiting for events at step 316.

Figure 20:
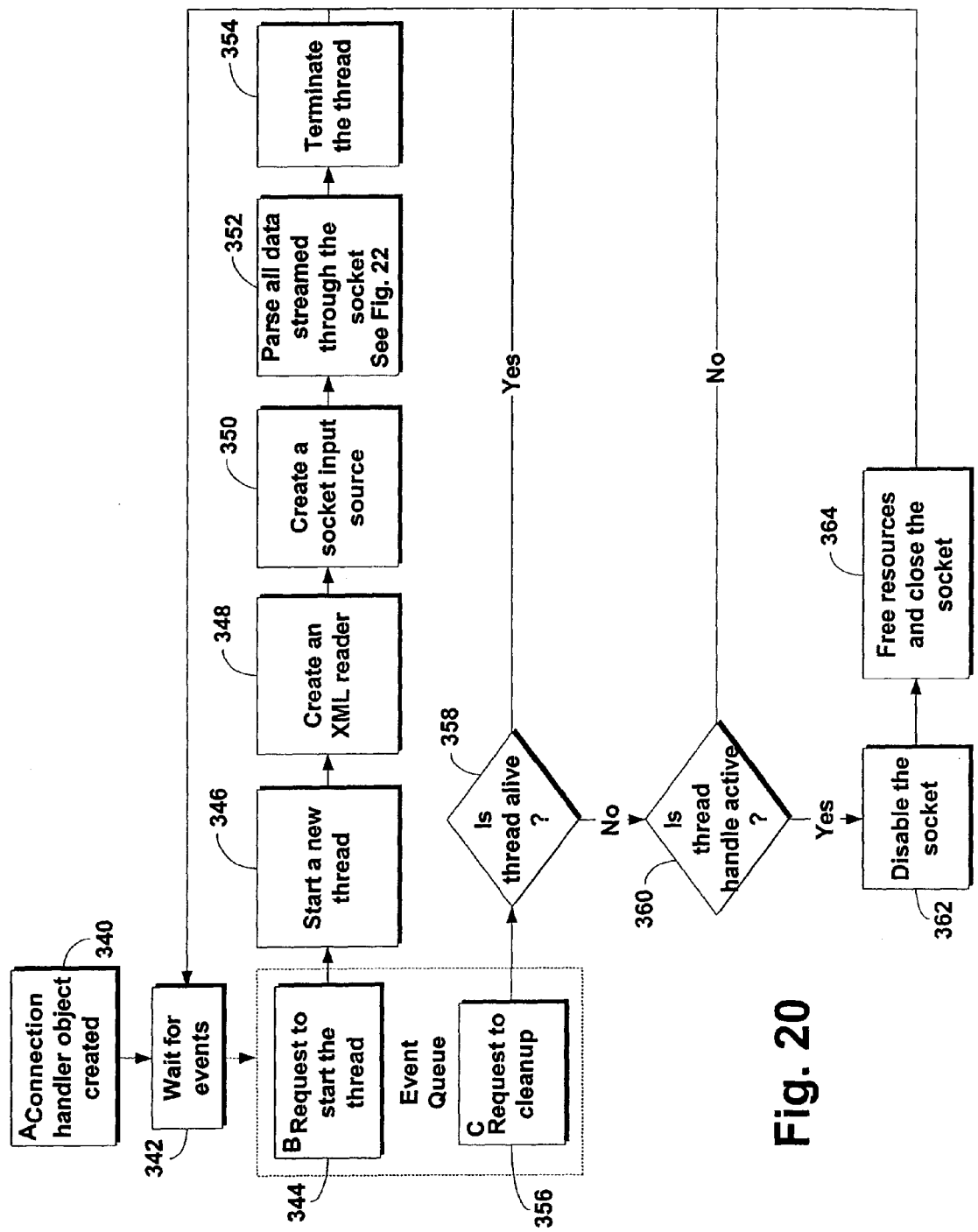

Turning now to FIG. 20, an embodiment of a system and method for handling a connection's communications is illustrated. In general, after a client connection has been accepted, it is handed off to a connection handler object. The connection handler is assigned to a particular connection and manages all of the communications through the connection until it is terminated. Each connection handler executes in its own thread, thereby allowing multiple connection handlers to operate simultaneously to achieve the benefits noted above.

Accordingly, a connection handler object is created at step 340. The system then waits, at step 342, for specific events which will determine any further execution. One possible event is a request to start a connection thread. At step 344, a request is received from step 322 to start the connection thread. In response, a new thread is generated and started at step 346. An XML reader is then created at step 348 and a socket input source is created at step 350. At step 352, as data is streamed through the socket, it is parsed in segments. When the end of the transmission signal is received, the thread is terminated at step 354 and the system resumes waiting for events at step 342.

Another possible specific event is a request to clean up. A request to clean up is received at step 356 from step 336. The system then checks the thread for activity at step 358. If the thread is no longer alive, the thread handle is checked to see if it is still active at step 360. If the thread is still alive or if the thread handle is inactive, the system resumes waiting for events at step 342. If the thread handle is active, the socket is disabled at step 362. Once the socket is disabled, the socket is closed and all related resources are freed at step 364. The system then resumes waiting for events at step 342.

Figure 21A:
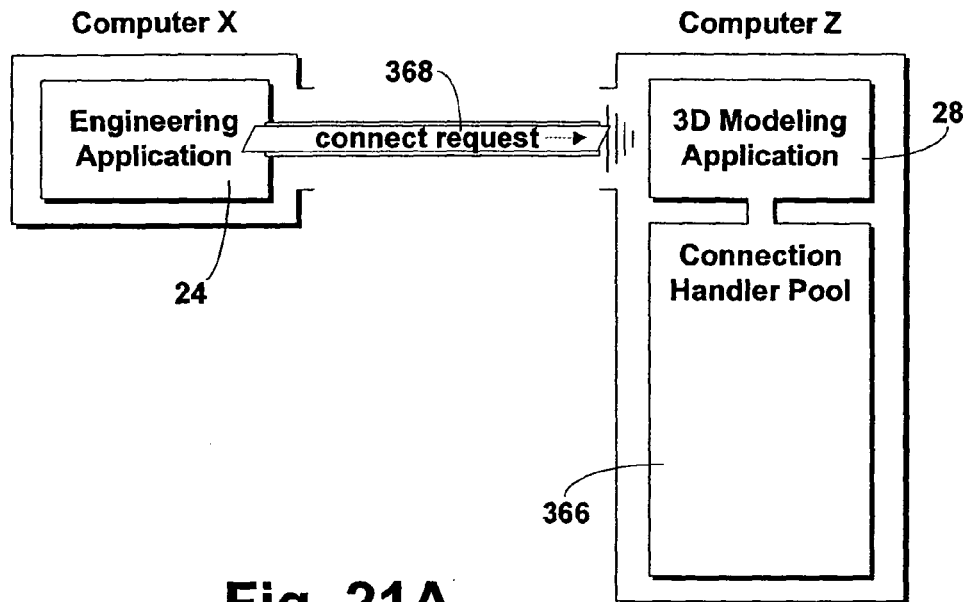
FIG. 21A-F are schematic diagrams illustrating various steps in the disclosed embodiment of a method of handling communications between applications.
Figure 21B:
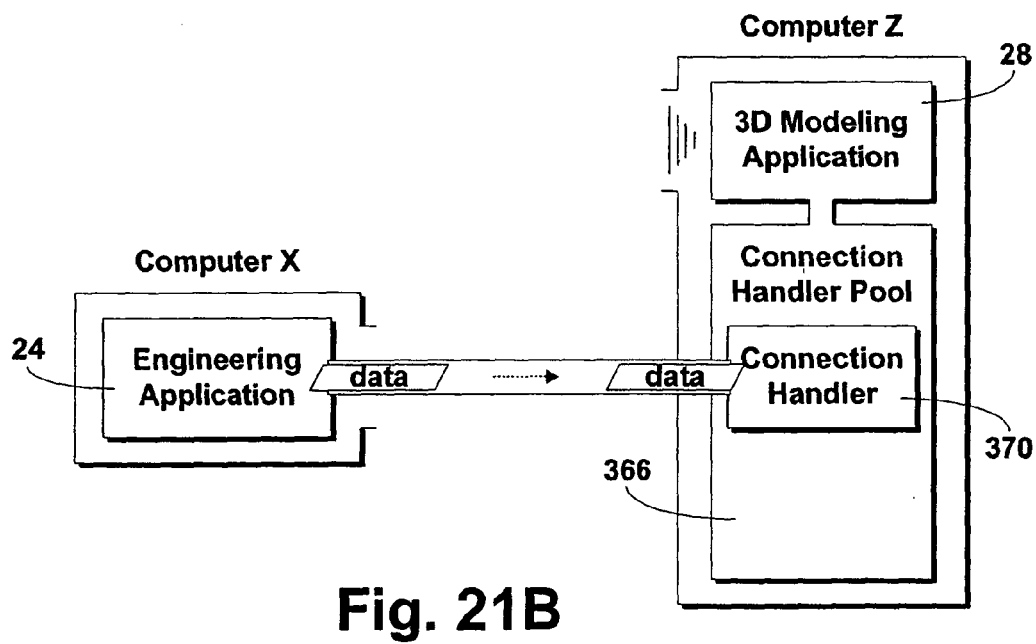

FIGS. 21A-F depict schematic diagrams of the steps used in the illustrated embodiment of a method of handling communications between applications. FIG. 21A illustrates a computer X having an engineering computer aided design software application 24 and a computer Z having a 3D modeling software application 28 and a connection handler pool 366. Computer X and computer Z are connected via a communications link 368. In this example, computer X first sends a connection request to computer Z via the communications link 368, as illustrated in FIG. 21A. Computer Z then accepts the connection, in FIG. 21B, and assigns a connection handler 370, that is added to the connection handler pool 366, to handle this connection. Computer X then begins to send streamed data to connection handler 370.

Figure 21C:
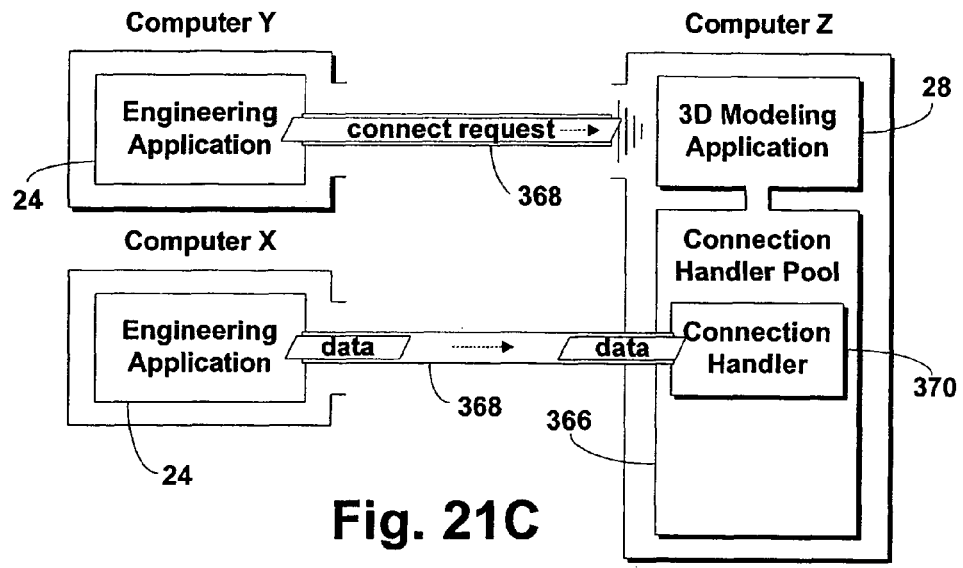
Figure 21D:
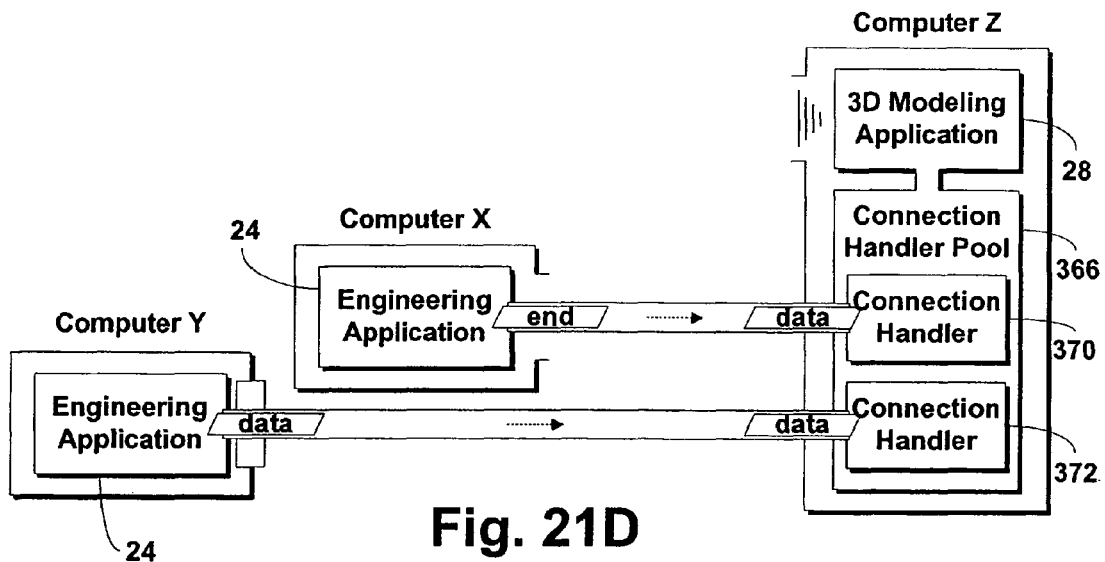

Next, in FIG. 21C, computer Y sends a connection request to computer Z. This could also be a second connection request from computer X, though it would be generated from a different application (a second connection request from the same application on computer X will not occur until all of data associated with the first connection has been sent). This occurs simultaneously while computer X is streaming data to the connection handler 370 of computer Z. The data from computer X is illustrated in FIG. 21C as coming across in segments. In FIG. 21D, computer Z accepts the connection and assigns a second connection handler 372, which has been added to the pool 366, to handle the connection with computer Y. Computer Z can then begin listening again for a new connection request while the connection handlers 370 and 372 receive the data. Computer Y begins to stream data to connection handler 372. At the same time, computer X sends an end of transmission signal.

Figure 21E:
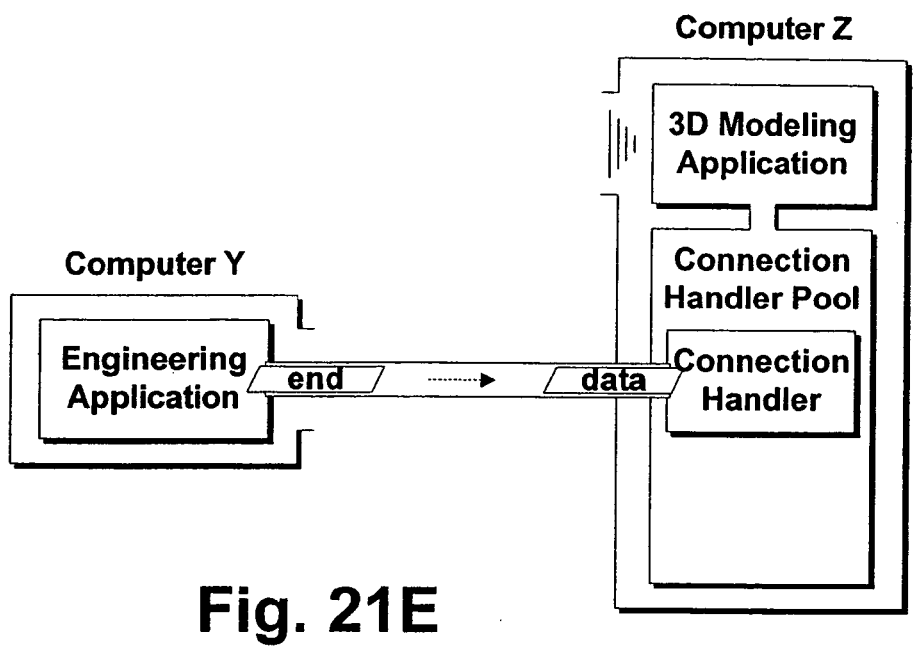
Figure 21F:
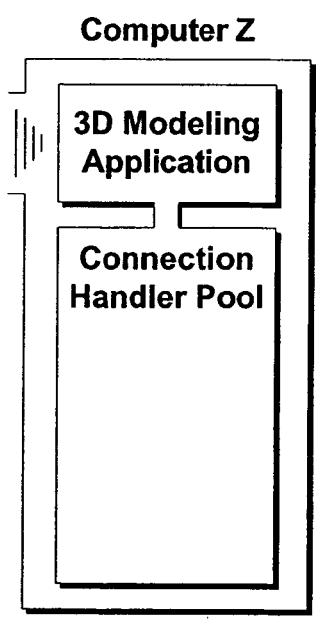

In FIG. 21E, computer Z has parsed the end of transmission signal from the data received from computer X. The connection handler 370 assigned to computer X is terminated. Responding to a request to tend connections, the connection handler pool 366 recognizes that connection handler 370 has bee terminated and removes it from the pool 366. Also in FIG. 21E, computer Y has now sent an end of transmission signal. In FIG. 21F, computer Z has parsed the end of transmission signal from the data stream received from computer Y. Now the connection handler 372 assigned to computer Y has been terminated. In another request to tend connections, the connection handler pool 366 has recognized the situation and removed connection handler 372 from the pool 366, thereby leaving the pool 366 empty. The pool 366 remains empty until computer Z receives another connection request.

Figure 22:
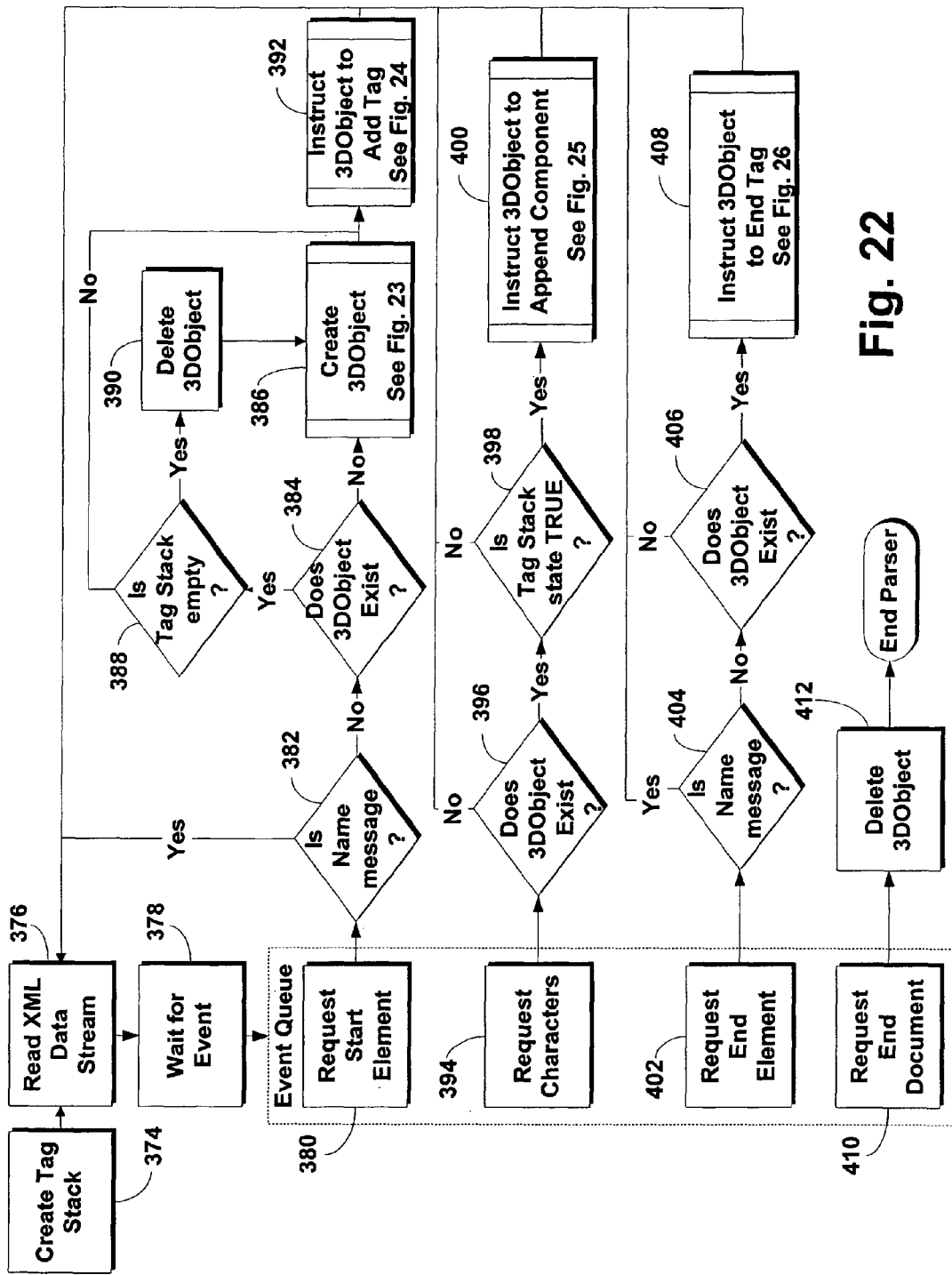

FIG. 22 illustrates a system and method for reading and parsing received data, which in the illustrated embodiment is an XML data stream. In the illustrated embodiment, data is streamed through a socket input source and arrives at a parser in segments. The XML data segments are then parsed and tags are identified. These tags are used to drive events that are important to the construction of objects in the 3D modeling package. A SAX parser is used in the illustrated embodiment. Accordingly, each time that a tag is read by the parser, a message is sent to a parse handler which executes the requested event. In the illustrated embodiment, there are only four events which are handled. However, in alternate embodiments, the number of events could be increased to accomplish a different functionality.

There are two objects that the parse handler uses in processing the input stream, namely, a Tag Stack and a 3DObject. The Tag Stack is used to keep track of the current state of the parse handler and the tag that is currently being processed. The 3DObject is used to consolidate parsed data and then to construct objects native to the 3D modeling environment.

Initially, at step 374, a Tag Stack object is created. Data is then read, at step 376 from the XML data stream. The system then waits at step 378 for specific events which will determine any further execution. One possible specific event is a start element request. At step 380, a request is made to start an element. This request is initiated when the parser recognizes a tag in the received data. In response to this request, the system determines at 382 if the tag name is "message". A message tag is used as an indicator that the present location is the beginning of a new message. Because it is not important for the object to know that the location is the beginning of a new message, if the determination is true, the system returns to step 376 and again reads from the XML data stream and waits for events at 378. If the determination at 382 was false, the information is passed on to a 3DObject add tag method at step 384.

At step 384, the system checks to see if a 3DObject exists. If a 3DObject does not exist, a new 3DObject is created at step 386. Step 386 is described in greater detail below with reference to FIG. 23. If the system determines that a 3DObject already exists at 384, the system determines, at 388, if the Tag Stack is empty. If the Tag Stack is empty, the existing 3DObject is deleted at step 390 and a new 3DObject is created at step 386. After the creation of a new 3DObject at 386, or if the Tag Stack was found not to be empty at 388, the 3DObject is instructed by the parse handler to add the current tag at step 392. Step 392 is described in greater detail below with reference to FIG. 24. Following step 392, the system returns to step 376 and reads more data from the XML data stream and waits for events at 378.

Another possible event is a characters request. This request is accompanied by characters that were read from the data stream. These characters are the content or value associated with an XML tag set. This character data is passed on to the current 3DObject which will handle it appropriately. The Tag Stack state is used to determine if the characters need to be read. The characters request is initiated by the parser regardless of whether it is needed or not. Inside the Tag Stack class, a Boolean flag is used to signify whether there will be characters to read.

At step 394, a characters request is made. In response, the system determines at 396 if a 3DObject exists. If a 3DObject does exist, the system checks the Tag Stack state at 398. If the Tag Stack state is found to be false (i.e. there are no characters to read) or if a 3DObject does not exist, the system returns to step 376 to read more data from the XML data stream. If the Tag Stack state was true (i.e. a Boolean flag was present indicating the existence of characters that need to be read), an append component instruction is sent to the 3DObject at step 400. Step 400 is described in greater detail below with reference to FIG. 25. The system then returns to step 376 to read more data and wait for events at 378.

A third possible event is an end element request. This event signals the end of a data group. It also triggers an end tag event for the current 3DObject. At step 402, an end element request is received from a tag in the data that was read at step 376. The system then determines at 404 if the tag name is "message". If the tag name is not message, the system determines, at step 406, if a 3DObject exists. If a 3DObject does exist, an end tag instruction is sent to the 3DObject at step 408. Step 408 is described in greater detail below with reference to FIG. 26. If the tag name was determined at 404 to be message or if it was determined at 406 that a 3DObject does not exist, the system returns to step 376 where more data is read from the XML data stream. The system also returns to step 376 after the end tag instruction is sent to the 3DObject at step 408.

A fourth possible specific event is an end document request. This signals that the end of the message has been reached and causes the system to delete the current 3DObject. At step 410 an end document request is received. The current 3DObject is deleted at step 412 and the process is terminated.

Figure 23:
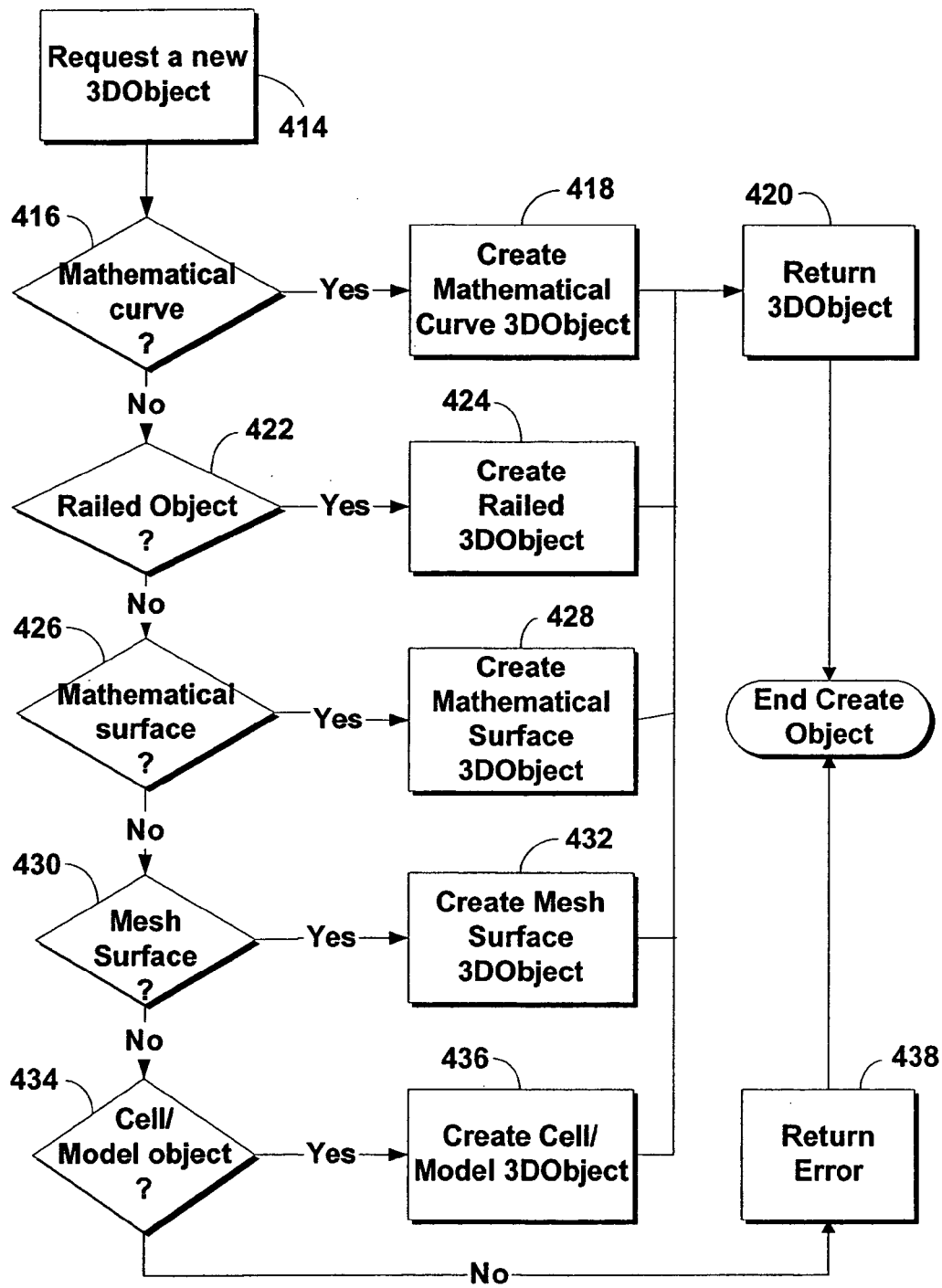

FIG. 23 illustrates an embodiment of a system and method for handling a 3DObject creation request and is a more detailed explanation of step 386. A request is received at step 414 from step 386 to create a new 3DObject. The system then determines, in the present embodiment, if the request is one to generate one of the currently supported objects. In the illustrated embodiment, there are five supported object creation requests. However, in alternate embodiments, this number could be increased to accommodate different functionality.

At step 416, the system determines, based on metadata associated with the request (i.e. information in a tag associated with the request), if the request is a request to create a mathematical curve. If the determination at 416 is true, then a 3DObject of type mathematical curve is created at step 418. In the illustrated embodiment, a NURBS curve will typically be created. However, this system can support the creation of other types of curves. The newly created 3DObject is returned back to the parse handler at step 420 and the process is terminated.

If it is determined at 416 that the request is not a request to create a mathematical curve, the system determines at 422 if the request is a request to create a railed surface, i.e. a request to extrude a surface along a generated curve or rail. If the determination is true, then a 3DObject of the type railed surface is created at step 424. The newly created railed surface 3DObject is returned to the parse handler at step 420 and the process is terminated.

If the determination at 422 was false, the system determines if the request is a request to create a mathematical surface at 426. If the determination is true, then a 3DObject of the type mathematical surface is created at step 428. In the illustrated embodiment, a NURBS surface will typically be created. However, this system can support the creation of other types of mathematical surfaces. The newly created mathematical surface 3DObject is then returned to the parse handler at step 420 and the process is terminated.

If the determination at 426 was false, the system determines at 430 if the request is a request to create a mesh surface. If the determination is true, then a 3DObject of the type mesh surface is created at step 432. The newly created mesh surface 3DObject is returned to the parse handler at step 420 and the process is terminated.

Finally, in the illustrated embodiment, if the determination at 430 was false, the system determines, at 434, if the request is a request to place cells or models from 3D libraries (this would correspond with a selected object that was determined to be transported as an entity replacement at 104). If the determination at 434 is true, then a 3DObject of the type cell/model is created at step 436. The newly created cell/model 3DObject is returned to the parse handler at step 420 and the process is terminated.

If the determination of step 334 is false, the system did not recognize the request as a handled request type and an error is returned to the user at step 438. The process is then terminated.

Figure 24:
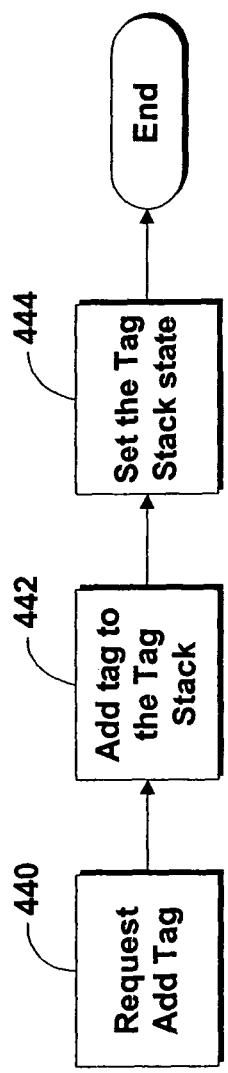

FIG. 24 illustrates an embodiment of a system and method for managing a Tag Stack and provides a more detailed explanation of possible steps for performing step 392 of FIG. 22. In the illustrated embodiment, a Tag Stack is used to keep track of the current state of the parser and the tag the parser is currently processing. A request is received at step 440 from step 392 to add a tag to the Tag Stack. A tag is then added to the Tag Stack at step 442 and the Tag Stack state is set (to true, if there are characters to evaluate, or to false, if there are no characters to evaluate) at step 444. The process is then terminated.

Figure 25:
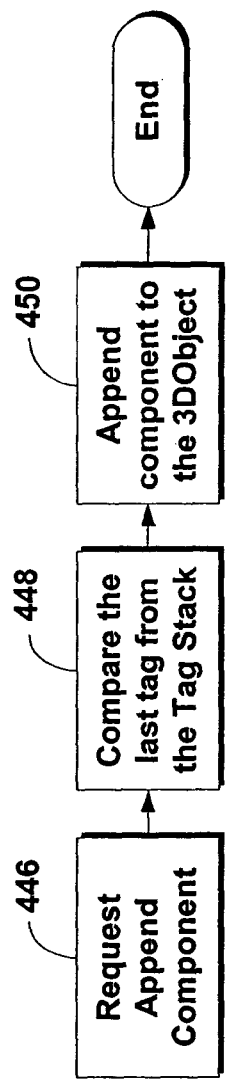

FIG. 25 illustrates an embodiment of a system and method of appending components and is a more detailed explanation of possible steps for accomplishing step 400 in FIG. 22. In the illustrated embodiment, a request is received at step 446 from step 400 to append a component to the 3DObject. The system then reviews the most recent tag that was placed on the Tag Stack at step 448 and responds, at step 450, by appending data to the 3DObject as indicated by the tag's type. For example the tag's type may indicate that data which accompanies the request is to be appended as an X coordinate of a geometric location point used in a 3DObject. The process is then terminated.

Figure 26:
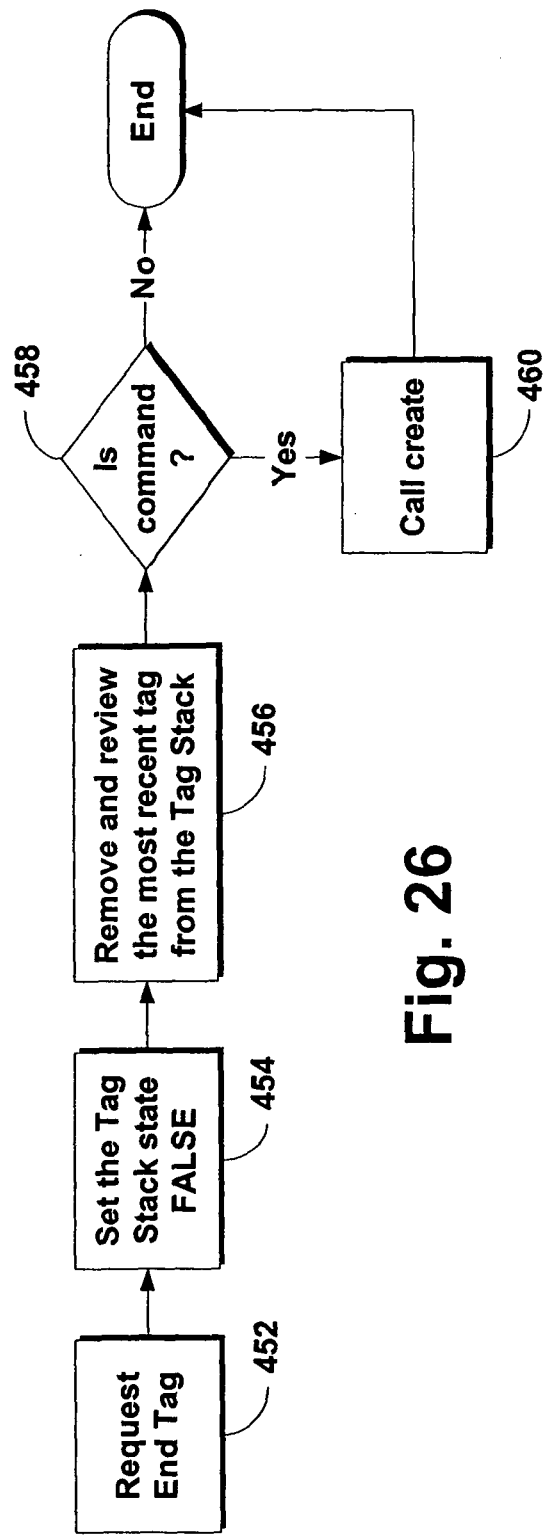

FIG. 26 illustrates an embodiment of a system and method for handling an end tag request and is a more detailed explanation of possible steps for accomplishing step 408 of FIG. 22 of the illustrated embodiment. An end tag request is received at step 452 from step 408. The system sets the Tag Stack to false at step 454 and removes and reviews the most recent tag that was placed on the Tag Stack at step 456. The system then determines at 458 if the tag represents a command. If the determination is false, the process is terminated. However, if the determination at 458 is true, the create method is called at step 460 and the process is terminated. The create method is the command that actually results in the creation of the object in the 3D software application. Up until step 460, the data has simply been stored in the 3DObject, which is a class that retains the information needed to construct the object.

Many variations can be made to the illustrated embodiment of the present invention without departing from the scope of the present invention. Such modifications are within the scope of the present invention. For example, a stand alone program could used that encapsulates steps 36, 38, & 42 and manipulates the engineering computer aided design application 24 and the 3D modeling application 28 directly without the need for a user to open either software package. Another example would be to implement a custom format and parser for the transfer data in place of the illustrated XML scheme. Other modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. Non-transitory computer-readable media ("media") having computer-executable instructions embodied thereon that, when executed, cause a computing device to perform a method of transferring engineering data to 3D models, the method comprising:

obtaining engineering data in a first electronic format from a computer aided design software component, wherein the first electronic format represents a three-dimensional engineering model;

selecting a plurality of objects associated with the engineering data;

scanning the engineering data for entity criteria that will be used to search for other objects to construct entity replacement commands;

assigning an object type to each of the plurality of objects, wherein object types include a mathematical curve, a railed surface, a mathematical surface, and a mesh;

for each of the plurality of objects, converting the object's engineering data to object type data corresponding to the assigned object type, wherein converting the object's engineering data includes A) when the assigned object type is a mathematical curve, then determining whether the object is to be converted to a NURBS curve or an alternate type of mathematical curve,
   1) when the object is to be converted to a NURBS curve, then generating a Bézier curve set from the object's engineering data, and
   2) when the object is to be converted to the alternate type of mathematical curve, then generating the alternate type of mathematical curve from the object's engineering data,
B) when the assigned object type is a railed surface, then determining whether the object is to be converted to a NURBS curve or an alternate type of mathematical curve,
   1) when the object is to be converted to a NURBS curve, then
      a) generating a Bézier curve set from the object's engineering data,
      b) generating a NURBS curve from the Bézier curve set, and
      c) appending geometric shape data for extruding a surface,
   2) when the object is to be converted to the alternate type of mathematical curve, then
      a) generating the alternate type of mathematical curve from the object's engineering data, and
      b) appending geometric shape data for extruding a surface,
C) when the assigned object type is a mathematical surface, then determining whether the object is to be converted to a NURBS surface or an alternate type of mathematical surface,
   1) when the object is to be converted to a NURBS surface, then
      a) reading one or more curve point data sets encapsulated in the object,
      b) generating a Bézier curve set for each of the one of more curve point data sets,
      c) generating a NURBS curve object for each of the one or more Bézier curve sets, and
   2) when the object is to be converted to the alternate type of mathematical surface, then generating the alternate type of mathematical surface from the object's engineering data, and
D) when the assigned object type is a mesh, wherein the object's engineering data defines non-overlapping triangle objects, then
   1) scanning the object's engineering data to generate a table of data indexing vertices of the triangle objects,
   2) scanning the engineering data to match each triangle object with corresponding vertex indices, and
   3) generating a vertex array based on the data in the table;
transporting the object type data to a 3D modeling software component via a plurality of connection handlers of a connection handler pool, wherein each of the plurality of connection handlers run in a separate system thread;
formatting the object type data to a second electronic format compatible with the 3D modeling software component; and
creating a 3D model according to the object type data for each of the plurality of objects via the 3D modeling software component.

2. The media of claim 1, wherein object types include an entity set object type.

3. The media of claim 2, wherein the converting the engineering data to a mesh object type comprises:
providing engineering data comprising a plurality of triangle objects which form a surface of one of the plurality of objects;
scanning a vertex of each of the plurality of triangle objects; and
generating a transfer set comprising a command header and a count of vertices and faces of the triangle objects.

4. The media of claim 3, wherein some of the plurality of triangle objects reference the same vertex.

5. The media of claim 3, wherein some of the plurality of triangle objects are reduced to a single hash table entry in a vertex array.

6. The media of claim 2, wherein converting the engineering data to an entity set object type comprises converting the engineering data to models from a 3D library.

7. The media of claim 2, wherein converting the engineering data to an entity set object type comprises:
scanning the engineering data for entity criteria for some of the plurality of objects;
forming an entity attribute transfer set for the plurality of objects meeting the scanned entity criteria; and
transporting the entity attribute transfer set for the plurality of objects meeting the scanned entity criteria to the 3D modeling software component.

8. The media of claim 7, wherein additional objects meeting the scanned entity criteria are located simultaneously while previously located objects meeting the scanned entity criteria are transported.

9. The media of claim 1, wherein the creating a 3D model comprises extruding a geometric shape along a rail generated from the engineering data.

10. A computer-implemented method of transferring data between a first computer having an engineering computer aided design (CAD) software component and a second computer having a 3D modeling software component, the computer-implemented method comprising:
connecting the engineering CAD software component to the 3D modeling software component via a communications link between the first computer and the second computer, the 3D modeling software component comprising a connection handler pool with each connection handler of the connection handler pool running in a separate system thread so as to listen for new events simultaneously with receiving data;
selecting a plurality of objects represented by engineering data in a first electronic format from the engineering CAD software component, wherein the first electronic format represents a three-dimensional engineering model;
assigning an object type to each of the plurality of objects, wherein object types include a mathematical curve, a railed surface, a mathematical surface, and a mesh;
converting the engineering data to an associated object type data for each of the assigned object types, wherein converting the engineering data includes
   A) when the assigned object type is a mathematical curve, then
      1) determining whether the object is to be converted to a NURBS curve or an alternate type of mathematical curve, and
      2) generating the determined type of curve,
   B) when the assigned object type is a railed surface, then
      1) determining whether the object is to be converted to a NURBS curve or an alternate type of mathematical curve, 2) generating the determined type of curve, and
3) appending geometric shape data for extruding a surface, C) when the assigned object type is the mathematical surface, then
1) determining whether the object is to be converted to a NURBS surface or an alternate type of mathematical surface, and
2) generating the determined type of surface, and D) when the assigned object type is a mesh, wherein the engineering data defines non-overlapping triangle objects, then
1) scanning the object's engineering data to determine associations between the triangle objects and triangle vertices, and
2) generating a vertex array based on the associations between the triangle objects and the triangle vertices;

streaming the converted object type data from the first computer to an assigned connection handler from the connection handler pool;

formatting the object type data to a second electronic format; and constructing a 3D model from the formatted object type data for each of the plurality of objects via the 3D modeling software component in the second computer, wherein converting the engineering data to an entity set object type comprises:

scanning the engineering data in the first electronic format for entity criteria for some of the plurality of objects, wherein the entity criteria comprises criteria that will be used to search for other objects to construct entity replacement commands;

forming an entity attribute transfer set in the second electronic format for the plurality of objects meeting the scanned entity criteria; and transporting the entity attribute transfer set for the plurality of objects meeting the scanned entity criteria to a receiving program to interface with the 3D modeling software component.

11. The computer-implemented method of claim 10, wherein the formatting the object type data to a second electronic format comprises formatting to XML.

12. The computer-implemented method of claim 10, wherein each of the assigned object types are created from the object's own associated data.

13. The computer-implemented method of claim 10, wherein the converting step comprises appending attributes derived from the engineering data to the associated object types.

14. The computer-implemented method of claim 10, wherein additional objects meeting the scanned entity criteria are located simultaneously while previously located objects meeting the scanned entity criteria are transported.

15. A computer-implemented method for utilizing engineering data from a computer-aided design (CAD) software component to generate technically accurate 3D models in connection with a 3D-modeling software component of a computer system, the computer-implemented method comprising:

receiving engineering data in a first electronic format from the CAD software component, wherein the engineering data includes a triangulated irregular network (TIN) model that defines a plurality of triangle objects which form a three-dimensional surface of a meshed object;

conducting a first scan of the engineering data for vertices of each of the plurality of triangle objects defined by the TIN model;

storing the vertices in a hash table, wherein each vertex is indexed in the hash table by a unique value;

generating a first transfer set comprising a command header and a count of vertices and faces of the triangle objects in a second electronic format;

transporting the first transfer set to a receiving program to interface with the 3D-modeling software component;

generating a second transfer set comprising a vertex array of vertex indexes based on the vertices stored in the hash table;

transporting the second transfer set to the 3D-modeling software component;

retrieving the vertex indexes from the vertex array for each of the plurality of triangle objects;

conducting a second scan of the engineering data to match a particular triangle object with corresponding vertex hash table indices, wherein data associated with the first scan is transported while the second scan is still in progress;

generating a third transfer set comprising face information of the plurality of triangle objects based on the second scan;

transporting the third transfer set to the 3D-modeling software component; and generating a 3D model of the meshed object from the first, second, and third transfer sets transported to the 3D-modeling software component via a graphical user interface of the computer system.

16. The computer-implemented method of claim 15, wherein some of the plurality of triangle objects reference the same vertex.

17. The computer-implemented method of claim 15, wherein some of the plurality of triangle objects are reduced to a single hash table entry in the vertex array.

18. The computer-implemented method of claim 15, wherein the vertex array comprises an index of each of the vertices in the vertex array, and an associated vertex hash table index is matched to each of the plurality of triangle objects.

* * * * *